US011557767B2

(12) United States Patent
Moghadam Esfahani et al.

(10) Patent No.: US 11,557,767 B2
(45) Date of Patent: Jan. 17, 2023

(54) FUEL CELL CATALYST SUPPORT BASED ON DOPED TITANIUM SUB OXIDES

(71) Applicant: University of Ontario Institute of Technology, Oshawa (CA)

(72) Inventors: Reza Alipour Moghadam Esfahani, Oshawa (CA); E. Bradley Easton, Oshawa (CA)

(73) Assignee: University of Ontario Institute of Technology, Oshawa (CA)

( * ) Notice: Subject to any disclaimer, the term of this patent is extended or adjusted under 35 U.S.C. 154(b) by 19 days.

(21) Appl. No.: 16/592,318

(22) Filed: Oct. 3, 2019

(65) Prior Publication Data

US 2020/0112032 A1    Apr. 9, 2020

Related U.S. Application Data

(60) Provisional application No. 62/740,634, filed on Oct. 3, 2018.

(51) Int. Cl.
*H01M 4/88* (2006.01)
*H01M 4/92* (2006.01)
*H01M 4/90* (2006.01)

(52) U.S. Cl.
CPC ......... *H01M 4/8803* (2013.01); *H01M 4/925* (2013.01); *H01M 4/9075* (2013.01)

(58) Field of Classification Search
CPC ... H01M 4/925; H01M 4/9075; H01M 4/8803
See application file for complete search history.

(56) References Cited

U.S. PATENT DOCUMENTS

| 6,482,763 | B2 | 11/2002 | Gregory et al. | |
|---|---|---|---|---|
| 8,318,382 | B2 | 11/2012 | Tamura et al. | |
| 9,608,278 | B2 | 3/2017 | Hayden et al. | |
| 2006/0188775 | A1* | 8/2006 | Mance | H01M 4/9083 429/482 |
| 2007/0082257 | A1 | 4/2007 | Tamura et al. | |
| 2007/0218646 | A1* | 9/2007 | Hitosugi | C03C 17/2456 438/449 |
| 2013/0202889 | A1* | 8/2013 | Ham | B82Y 30/00 428/402 |
| 2014/0308603 | A1* | 10/2014 | Roh | H01M 4/925 429/524 |
| 2015/0096896 | A1* | 4/2015 | Gulla | C25B 11/093 205/334 |

(Continued)

OTHER PUBLICATIONS

Esfahani (Esfahani et al, "A fuel cell catalyst support based on doped titanium suboxides with enhanced conductivity, durability and fuel cell performance", J. Mater. Chem. A, 2018, 6, 14805) (Year: 2018).*

(Continued)

*Primary Examiner* — Jeremiah R Smith
(74) *Attorney, Agent, or Firm* — Bereskin & Parr LLP

(57) ABSTRACT

A fuel cell electrocatalyst and a fuel cell catalyst support structure are described herein. The fuel cell electrocatalyst includes the support structure. The support structure includes at least one titanium suboxide, a first dopant and a second dopant. The first dopant is a metal and the second dopant is a Group IV element. The fuel cell electrocatalyst also includes a metal catalyst deposited on the support structure.

8 Claims, 21 Drawing Sheets

(56) References Cited

U.S. PATENT DOCUMENTS

2016/0236174 A1* 8/2016 Lowry .................. B01J 35/1019
2019/0016605 A1* 1/2019 Kinoshita ................ B01J 19/08

OTHER PUBLICATIONS

Huang et al., "High-performance transition metal-doped Pt3Ni octahedra for oxygen reduction reaction", Science, 2015, 348, 1230-1234.

Choi et al., "Drawing Circuits with Carbon Nanotubes: Scratch-Induced Graphoepitaxial Growth of Carbon Nanotubes on Amorphous Silicon Oxide Substrates", Scientific Reports, 2014, 4, 5289.

Han et al., "Multiwalled carbon nanotube-supported Pt/Sn and Pt/Sn/PMo12 electrocatalysts for methanol electro-oxidation", International Journal of Hydrogen Energy, 2009, 34, 2426-2434.

Long et al., "Pt/CN-doped electrocatalysts: Superior electrocatalytic activity for methanol oxidation reaction and mechanistic insight into interfacial enhancement", Applied Catalysis B: Environmental, 2017, 203, 541-548.

Wan et al., "Nitrogen-doped ordered mesoporous carbon: synthesis and active sites for electrocatalysis of oxygen reduction reaction", Applied Catalysis B: Environmental, 2015, 165, 566-571.

Ding et al., "Preparation and characterization of carbon-supported PtTi alloy electrocatalysts", Journal of Power Sources, 2008, 175, 794-799.

Pereira et al., "Functionally Modified Macroporous Membrane Prepared by using Pulsed Laser Deposition", Advanced Functional Materials, 2007, 17, 443-450.

Kartachova et al., "Bimetallic molybdenum tungsten oxynitride: structure and electrochemical properties", Journal of Materials Chemistry A, 2013, 1, 7889-7895.

Eastcott et al., "Electrochemical and Morphological Studies of Ceramic Carbon Electrodes for Fuel Cell Systems", ECS Transactions, 2011, 41, 853-864.

Easton et al., "An electrochemical impedance spectroscopy study of fuel cell electrodes", Electrochimica Acta, 2005, 50, 2469-2474.

Saleh et al., "Diagnosing Degradation within PEM Fuel Cell Catalyst Layers Using Electrochemical Impedance Spectroscopy", Journal of The Electrochemical Society, 2012, 159, B546-B553.

Patru et al., "Pt/IrO2—TiO2 cathode catalyst for low temperature polymer electrolyte fuel cell—Application in MEAs, performance and stability issues", Catalysis Today, 2016, 262, 161-169.

Greeley et al., "Alloys of platinum and early transition metals as oxygen reduction electrocatalysts", Nature Chemistry, 2009, 1, 552-556.

Mukerjee et al., "Role of Structural and Electronic Properties of Pt and Pt Alloys on Electrocatalysis of Oxygen Reduction: An In Situ XANES and EXAFS Investigation", Journal of The Electrochemical Society, 1995, 142, 1409.

Zhang et al., "Controlling the Catalytic Activity of Platinum-Monolayer Electrocatalysts for Oxygen Reduction with Different Substrates", Agnewandte Chemie, Int. Ed., 2005, 117(14), 2170-2173.

Trung-Thanh et al., "Synthesis of Ti0.7Mo0.3O2 supported-Pt nanodendrites and their catalytic activity and stability for oxygen reduction reaction", Applied Catalysis B: Environmental, 2014, 154-155, 183-189.

Yin et al., "A highly stable catalyst for PEM fuel cell based on durable titanium diboride support and polymer stabilization", Applied Catalysis B: Environmental, 2010, 93, 233-240.

Anwar et al., "Enhanced durability of Pt electrocatalyst with tantalum doped titania as catalyst support", International Journal of Hydrogen Energy, 2017, 42, 30750-30759.

Savych et al., "On the effect of non-carbon nanostructured supports on the stability of Pt nanoparticles during voltage cycling: A study of TiO2 nanofibres", Journal of Power Sources, 2014, 257, 147-155.

Senevirathne et al., "Electrocatalytic activity and durability of Pt/NbO2 and Pt/Ti4O7 nanofibers for PEM fuel cell oxygen reduction reaction", Electrochimica Acta, 2012, 59, 538-547.

Schmittinger et al., "A review of the main parameters influencing long-term performance and durability of PEM fuel cells", Journal of Power Sources, 2008, 180, 1-14.

Saleh et al., "Assessment of the ethanol oxidation activity and durability of Pt catalysts with or without a carbon support using Electrochemical Impedance Spectroscopy", Journal of Power Sources, 2014, 246, 392-401.

Rodriguez, "Physical and chemical properties of bimetallic surfaces", Surface Science Reports, 1996, 24, 223-287.

Debe et al., "High voltage stability of nanostructured thin film catalysts for PEM fuel cells", Journal of Power Sources, 2006, 161, 1002-1011.

Ammam et al., "High-performance glucose sensor based on glucose oxidase encapsulated in new synthesized platinum nanoparticles supported on carbon Vulcan/Nafion composite deposited on glassy carbon", Sensors and Actuators B, Elsevier, 2011, 340-346.

Rahman et al., "The application of power-generating fuel cell electrode materials and monitoring methods to breath alcohol sensors", Sensors and Actuators B, Elsevier, 2016, 448-457.

Ghavidel et al., "Fuel cell-based breath alcohol sensors utilizing Pt-alloy electrocatalysts", Sensors and Actuators B: Chemical, Elsevier, 273 (2018), 574-584.

Hsieh et al., "Platinum loaded on dual-doped TiO2 as an active and durable oxygen reduction catalyst", NPG Asia Materials, 9 (2017), 8 pages.

Mohamed et al., "Photoelectrochemical behavior of bimetallic Cu—Ni and monometallic Cu, Ni doped TiO2 for hydrogen production", International Journal of Hydrogen Energy, 2015, 40, 14031-14038.

Tripkovic et al., "Metal Oxide-Supported Platinum Overlayers as Proton-Exchange Membrane Fuel Cell Cathodes", ChemCatChem, 2012, 4, 228-235.

Higgins et al., "Nitrogen-Doped Carbon Nanotubes as Platinum Catalyst Supports for Oxygen Reduction Reaction in Proton Exchange Membrane Fuel Cells", Journal of Physical Chemistry: C, 2010, 114, 21982-21988.

Zhou et al., "Enhancement of Pt and Pt-alloy fuelcellcatalyst activity and durability vianitrogen-modified carbon supports", Energy & Environmental Science, 2010, 3, 1437-1446.

Zou et al., "Mechanisms of the oxygen reduction reaction on B- and/or N-doped carbon nanomaterials with curvature and edge effects", Nanoscale, 2018, 10, 1129-1134.

Saxman, "Materials for Proton Exchange Membranes and Membrane Electrode Assemblies for PEM Fuel Cells", BCC Publishing, Sep. 2015.

Debe, "Electrocatalyst approaches and challenges for automotive fuel cells", Nature, 2012, 486, 43-51.

Borup et al., "Scientific Aspects of Polymer Electrolyte Fuel Cell Durability and Degradation", Chemical Reviews, 2007, 107, 3904-3951.

Wei et al., "Towards active and stable oxygen reduction cathodes: a density functional theory survey on Pt2M skin alloys" Energy & Environmental Science, 2011, 4, 1268-1272.

Gasteiger et al., "Activity benchmarks and requirements for Pt, Pt-alloy, and non-Pt oxygen reduction catalysts for PEMFCs" Applied Catalysis B: Environmental, 2005, 56, 9-35.

Zhang et al., "Integrated high-efficiency Pt/carbon nanotube arrays for PEM fuel cells", Advanced Energy Materials, 2011, 1 (4), 671-677.

Tian et al., "A Highly Order-Structured Membrane Electrode Assembly with Vertically Aligned Carbon Nanotubes for Ultra-Low Pt Loading PEM Fuel Cells" Advanced Energy Materials, 2011, 1, 1205-1214.

Adzic et al., "Platinum Monolayer Fuel Cell Electrocatalysts" Topics in Catalysis, 2007, 46, 249-262.

Zhang et al., "An overview of metal oxide materials as electrocatalysts and supports for polymer electrolyte fuel Dells", Energy & Environmental Science, 2014, 7, 2535-2558.

Sui et al., "A comprehensive review of Pt electrocatalysts for the oxygen reduction reaction: Nanostructure, activity, mechanism and carbon support in PEM fuel cells", Journal of Materials Chemistry A, 2017, 5, 1808-1825.

(56) References Cited

OTHER PUBLICATIONS

Wu et al., "A review of PEM fuel cell durability: Degradation mechanisms and mitigation strategies", Journal of Power Sources, 2008, 184, 104-119.
Wilkinson et al., "Handbook of Fuel Cells: Fundamentals, Technology and Applications", John Wiley & Sons Ltd., 2003, vol. 3, pp. 611-626.
Gimenez-Lopez et al., "Extremely Stable Platinum-Amorphous Carbon Electrocatalyst within Hollow Graphitized Carbon Nanofibers for the Oxygen Reduction Reaction", Advanced Materials, 2016, 28, 9103-9108.
Sasaki et al., "Niobium oxide-supported platinum ultra-low amount electrocatalysts for oxygen reduction", Physical Chemistry Chemical Physics, 2008, 10, 159-167.
Tang et al., "TiO2-modified CNx nanowires as a Pt electrocatalyst support with high activity and durability for the oxygen reduction reaction", Physical Chemistry Chemical Physics, 2016, 18, 1500-1506.
Eastcott et al.,"Electrochemical studies of ceramic carbon electrodes for fuel cell systems: A catalyst layer without sulfonic acid groups", Electrochimica Acta, 2009, 54, 3460-3466.
He et al., "PEM Fuel Cell Catalysts: Cost, Performance, and Durability", Electrochemical Society Interface, 2005, 41-44.
Esfahani et al., "Innovative carbon-free low content Pt catalyst supported on Mo-doped titanium suboxide (Ti3O5-Mo) for stable and durable oxygen reduction reaction", Applied Catalysis B: Environmental, 2017, 201, 419-429.
Esfahani et al., "Highly active platinum supported on Mo-doped titanium nanotubes suboxide (Pt/TNTS-Mo) electrocatalyst for oxygen reduction reaction in PEMFC", Renewable Energy, 2018, 120, 209-219.
Ho et al., "Robust non-carbon Ti0.7Ru0.3O2 support with co-catalytic functionality for Pt: enhances catalytic activity and durability for fuel cells", Energy & Environmental Science, 2011, 4, 4194-4200.
Ho et al., "Nanostructured Ti0.7Mo0.3O2 Support Enhances Electron Transfer to Pt: High-Performance Catalyst for Oxygen Reduction Reaction", Journal of the American Chemical Society, 2011, 133, 11716-11724.
Tian et al., "Unique Electrochemical Catalytic Behavior of Pt Nanoparticles Deposited on TiO2 Nanotubes", ACS Catalysis, 2012, 2, 425-432.
Zhang et al., "Mixed-Metal Pt Monolayer Electrocatalysts for Enhanced Oxygen Reduction Kinetics", Journal of the American Chemical Society, 2005, 127, 12480-12481.
Huang et al., "Electrocatalytic Activity and Stability of Titania-Supported Platinum-Palladium Electrocatalysts for Polymer Electrolyte Membrane Fuel Cell", ACS Catalysis, 2012, 2, 825-831.
Stamenkovic et al., "Improved Oxygen Reduction Activity on Pt3Ni(111) via Increased Surface Site Availability", Science, 2007, 315 (5811), 493-497.
Esfahani et al., "Stable and methanol tolerant Pt/TiOx-C electrocatalysts for the oxygen reduction reaction", International Journal of Hydrogen Energy, 2015, 40, 14529-14539.
Odetola et al., "Photo enhanced methanol electrooxidation: Further insights into Pt and TiO2 nanoparticle contributions", Applied Catalysis B: Environmental, 2017, 210, 263-275.
Huang et al., "Nanoscale conductive niobium oxides made through low temperature phase transformation for electrocatalyst support", RSC Advances, 2014, 4, 9701-9708.
Ruiz-Camacho et al., "Pt/C and Pt/TiO2-C electrocatalysts prepared by chemical vapor deposition with high tolerance to alcohols in oxygen reduction reaction", Journal of Electroanalytical Chemistry, 2014, 725, 19-24.
Dae-Suk et al., "Additive treatment effect of TiO2 as supports for Pt-based electrocatalysts on oxygen reduction reaction activity", Electrochimica Acta, 2010, 55, 3628-3633.
Huang et al., "Increasing Pt oxygen reduction reaction activity and durability with a carbon-doped TiO2 nanocoating catalyst support", Journal of Materials Chemistry, 2012, 22, 16824-16832.
Eastcott et al., "Sulfonated silica-based fuel cell electrode structures for low humidity applications", Journal of Power Sources, 2014, 245, 487-494.
Zheng et al., "Highly performed non-humidification membrane electrode assembly prepared with binary RuO2—SiO2 oxide supported Pt catalysts as anode", International Journal of Hydrogen Energy, 2012, 37, 13103-13109.
Seok et al., "Dopamine-induced Pt and N-doped carbon@silica hybrids as high-performance anode catalysts for polymer electrolyte membrane fuel cells", RSC Advances, 2014, 4, 42582-42584.
Thangamuthu et al., "Preparation of gas diffusion electrodes using PEG/SiO2 hybrid materials and the effect of their composition on microstructure of the catalyst layer and on fuel cell performance", Journal of Power Sources, 2006, 161, 160-167.
US Department of Energy, "2014 Annual Progress Report V. Fuel Cells", (accessed on Dec. 2015). <http://www.hydrogen.energy.gov/annual_progress14_fuelcells.html?print>.
Li et al., "The synthesis and gas sensitivity of the β-Ti3O5 powder: Experimental and DFT study", Journal of Alloys and Compounds, 2015, 649, 939-948.
Zhang et al., "A Ti-coated nano-SiC supported platinum electrocatalyst for improved activity and durability in direct methanol fuel cells", Journal of Materials Chemistry A, 2014, 2, 10146-10153.
Li et al., "Functional links between Pt single crystal morphology and nanoparticles with different size and shape: the oxygen reduction reaction case", Energy & Environmental Science, 2014, 7, 4061-4069.
Tauc et al., "Optical Properties and Electronic Structure of Amorphous Germanium", Physica Status Solidi B, 1966, 15, 627-637.
Tanaka et al., "Structural Phase Transition between γ-Ti3O5 and δ-Ti3O5 by Breaking of a One-Dimensionally Conducting Pathway", Crystal Growth & Design, 2015, 15, 653-657.
Ohkoshi et al., "Synthesis of a metal oxide with a room-temperature photoreversible phase transition", Nature Chemistry, 2010, 2, 539-545.
Liu et al., "Electronic, magnetic and optical properties of β-Ti3O5 and λ-Ti3O5: A density functional study", Computational Materials Science, 2014, 81, 158-162.
Stem et al., "Formation of Ti(III) and Ti(IV) states in Ti3O5 nano- and microfibers obtained from hydrothermal annealing of C-doped TiO2 on Si", Thin Solid Films, 2014, 558, 67-74.
Li et al., "Magneli phase Ti4O7 electrode for oxygen reduction reaction and its implication for zinc-air rechargeable batteries", Electrochimica Acta, 2010, 55, 5891-5898.
Gopel et al., "Intrinsic defects of TiO2(110): Interaction with chemisorbed O2, H2, CO, and CO2", Physical Review B: Condensed Matter and Materials Physics, 1983, 28, 3427-3438.
Shi et al., "Tuning the Electronic Structure of Titanium Oxide Support to Enhance the Electrochemical Activity of Platinum Nanoparticles", Nano Letters, 2013, 13, 4469-4474.
Valentin et al., "Theory of Carbon Doping of Titanium Dioxide", Chemistry of Materials, 2005, 17, 6656-6665.
Baker et al., "Highly n-Type Titanium Oxide as an Electronically Active Support for Platinum in the Catalytic Oxidation of Carbon Monoxide", Journal of Physical Chemistry: C, 2011, 115, 16006-16011.
Justin et al., "Methanol oxidation on MoO3 promoted Pt/C electrocatalyst", International Journal of Hydrogen Energy, 2011, 36, 5875-5884.

* cited by examiner

FUEL CELL CATALYST SUPPORT BASED ON DOPED TITANIUM SUB OXIDES

CROSS-REFERENCE

This application claims the benefit of U.S. Provisional Patent Application No. 62/740,634, filed Oct. 3, 2018, and the entire contents of U.S. Provisional Patent Application No. 62/740,634 is hereby incorporated by reference.

FIELD

This disclosure relates generally to fuel cell electrocatalysts, and more specifically to fuel cell electrocatalysts having support structures based on doped titanium suboxides.

BACKGROUND

A fuel cell is an electrochemical cell that converts the chemical energy from a fuel into electricity through an electrochemical reaction. Fuel cells require a continuous source of fuel and oxygen (usually from air) to sustain the electrochemical reaction and can produce electricity continuously for as long as fuel and oxygen are supplied.

There are several types of fuel cells currently under development, each with its own advantages, limitations, and potential applications. For instance, one type of fuel cell design currently under development uses a solid polymer electrolyte ("SPE") membrane or a proton exchange membrane ("PEM"), to provide ion transport between the anode and cathode. In PEM type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one surface, and a cathode catalyst on the opposite surface. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode then has catalyst particles arranged thereon, supported on carbon particles, to promote ionization of hydrogen at the anode and reduction of oxygen at the cathode. Protons flow from the anode through the ionically conductive polymer membrane to the cathode where they combine with oxygen to form water, which is discharged from the cell.

PEM fuel cells are generally clean, portable power sources that are powered by hydrogen or alcohols from secure and renewable sources and may be a solution for non-polluting and highly efficient vehicles and portable devices.

Current PEM fuel cells rely on platinum (Pt) electrocatalysts to drive the anodic and cathodic reactions. The support material onto which the Pt catalyst is dispersed can exert a significant influence on its electroactivity and durability. Normally, Pt nanoparticles (NPs) are dispersed onto a high surface area carbon support (Pt/C) to maximize the active surface area of the catalyst. Carbon black has been the de facto catalyst support in fuel cells over the last 30 years due to its high surface area and electrical conductivity. However, carbon can be a liability when it comes to durability since it is prone to corrosion under the highly acidic and oxidative operating conditions of a PEM fuel cell. Carbon corrosion can be detrimental to the long-term performance of a fuel cell. Furthermore, even when carbon corrosion does not occur, Pt aggregation can occur on carbon, which decreases the electrochemically active surface area (ECSA) of the catalyst, and subsequently the performance of the electrode. This is particularly evident during prolonged open-circuit potential (OCP) or under repeated start-stop cycles.

Accordingly, there is a need to replace the traditional carbon supports in PEM fuel cells with a corrosion stable support.

Many metal oxides such as $TiO_2$, $NbO_x$, $WO_x$, and $MoO_x$ offer low corrosion and strong interaction with Pt NPs. In fact, many of these metal oxides also enhance the catalytic activity of Pt towards the oxygen reduction reaction (ORR) via an electronic interaction and can also promote homogeneous dispersion of Pt particles.

However, most metal oxides suffer from poor electronic conductivity, which limits their practical use in fuel cell devices. As such, many researchers have investigated composite supports, where metal oxides are combined with carbon black in order to harness the desirable properties of both materials.

While these materials do show some promising activity for the ORR, researchers using this approach have faced challenges optimizing contact between the metal oxide and carbon in order to maintain sufficient electronic conductivity.

SUMMARY

In accordance with a broad aspect, there is provided a fuel cell electrocatalyst including a support structure. The support structure includes at least one titanium suboxide, a first dopant and a second dopant. The first dopant is a metal and the second dopant is a Group IV element. The fuel cell electrocatalyst also includes a metal catalyst deposited on the support structure.

In at least one embodiment, the first dopant comprises one of chromium, molybdenum and tungsten.

In at least one embodiment, the first dopant is molybdenum.

In at least one embodiment, the second dopant comprises one of silicon, germanium, tin and lead.

In at least one embodiment, the second dopant is silicon.

In at least one embodiment, the support structure has the formula $Ti_3O_5$—$Mo_xSi_y$, and x and y are each less than 1.

In at least one embodiment, the support structure has the formula $Ti_3O_5$—$Mo_xSi_y$, and x and y are each less than 0.5.

In at least one embodiment, the support structure has the formula $Ti_3O_5$—$Mo_xSi_y$, and x is 0.2.

In at least one embodiment, the support structure has the formula $Ti_3O_5$—$Mo_xSi_y$, and y is 0.4.

In at least one embodiment, the support structure has the formula $Ti_3O_5$—$Mo_xSi_y$, and x is 0.2 and y is 0.4.

In at least one embodiment, the support structure has a band gap that is less than 1 eV.

In at least one embodiment, the support structure has a band gap that is about 0.31 eV.

In at least one embodiment, the catalyst layer is a metal catalyst.

In at least one embodiment, the metal catalyst is platinum or a platinum alloy.

In accordance with a broad aspect, there is provided a fuel cell electrocatalyst support structure. The support structure includes at least one titanium suboxide, a first dopant and a second dopant. The first dopant is a metal and the second dopant is Group IV element.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
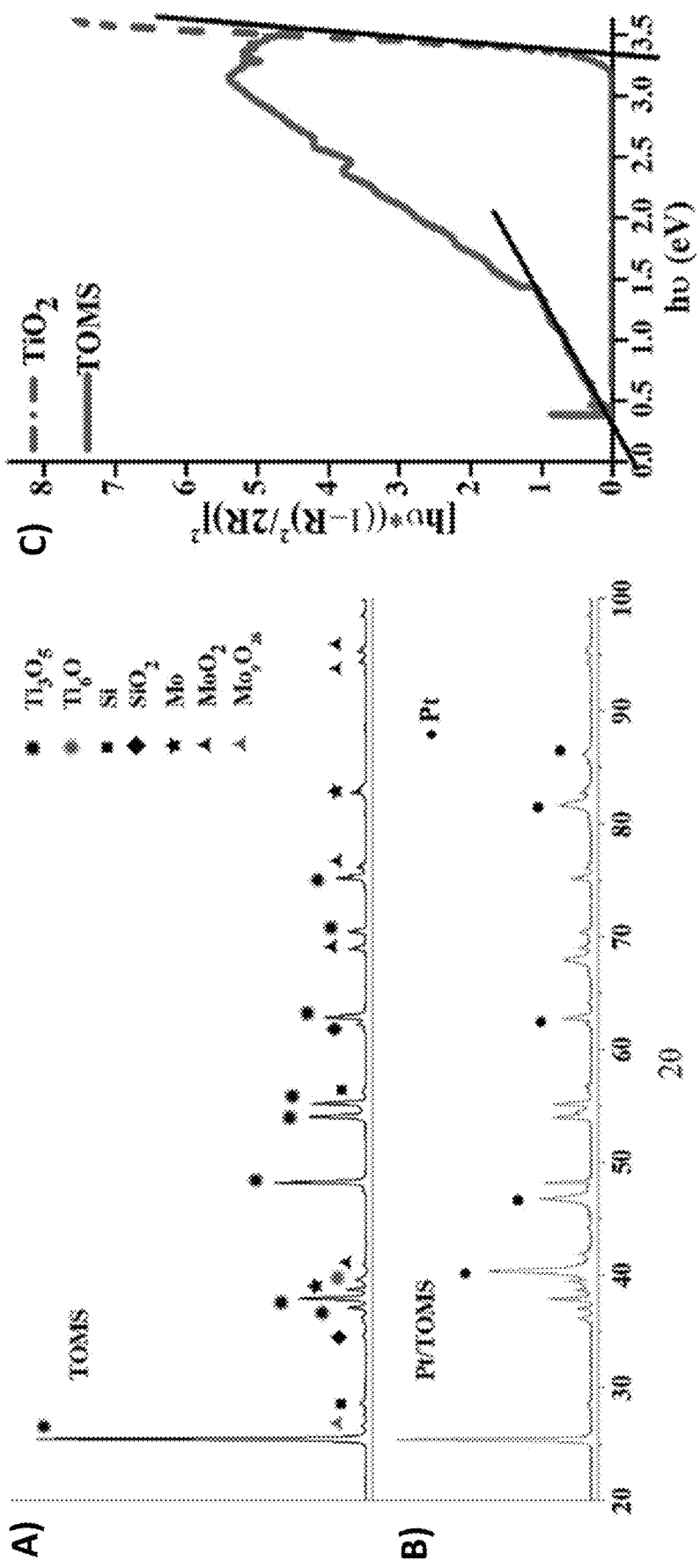
FIG. 1A is an X-ray diffraction pattern obtained for a TOMS electrocatalyst.
FIG. 1B is an X-ray diffraction pattern obtained for a Pt/TOMS support structure.
FIG. 1C is a band gap energy determination of commercial $TiO_2$ and the TOMS support structure.

Further aspects and features of the example embodiments described herein will appear from the following description taken together with the accompanying drawings.

DESCRIPTION OF EXAMPLE EMBODIMENTS

Various apparatuses, methods and compositions are described below to provide an example of at least one embodiment of the claimed subject matter. No embodiment described below limits any claimed subject matter and any claimed subject matter may cover apparatuses and methods that differ from those described below. The claimed subject matter are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed subject matter. Any subject matter that is disclosed in an apparatus, method or composition described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term, such as 1%, 2%, 5%, or 10%, for example, if this deviation does not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Recently, there has been a growing interest in creating metal oxides with sufficient electrical conductivity to be a practical catalyst support. Among the available candidates, considerable attention has been paid to titanium suboxides ($Ti_xO_{2x-1}$) since they possess improved electronic conductivity compared to $TiO_2$ and high oxidative stability. Furthermore, the addition of a dopant into the titanium suboxide structure can further enhance electronic conductivity. Recently, studies have reported a process of modifying $TiO_2$ with Mo to form a Mo-doped titanium suboxide ($Ti_3O_5$—Mo). The Pt/$Ti_3O_5$—Mo catalyst showed enhanced ORR activity and durability despite the support still having a sizable band gap (2.6 eV). However, in spite of the technologies that have been developed, there remains a need in the field for improvements in the development of fuel cell catalyst supports.

Herein, a metal oxide material with enhanced electronic conductivity is prepared and proposed for use as a catalyst support structure in electrochemical devices. The process of forming the catalyst support structure involves the use of sequential doping of $TiO_2$ with two different elements to create oxygen vacancies within the lattice of the metal oxide. The resulting dual-doped suboxide has a substantially lower band gap, which is lower than doping with just a single element, rendering it suitable for use in electrochemical devices.

In one aspect, deposition of catalyst nanoparticles (e.g. Pt) onto the surface of the catalyst support structure creates a material that may be suitable for use in PEM fuel cells. Electrochemical testing revealed that the catalyst support structure has high activity and performance in a PEM fuel cell. Furthermore, accelerated stress testing demonstrated that the dual-doped suboxide catalyst support structure is stable and durable under the harsh operating condition of PEM fuel cells.

According to one aspect of the teachings herein, a carbon-free multifunctional titanium suboxide with two dopants (i.e. doping elements) has been developed as a fuel cell support structure. The carbon-free multifunctional titanium suboxide support structure has high electronic conductivity for a metal oxide (as further described below). As noted above, $Ti_3O_5$—Mo-based support structures, where Mo is a first dopant, are generally known in the art. However, in at least one embodiment in accordance with the teachings herein, to improve the conductivity of $Ti_3O_5$—Mo-based support structures for fuel cells, a second dopant has been introduced into the $Ti_3O_5$—Mo-based support structure. The second dopant can be a Group IV element. For instance, the second dopant can be silicon (Si). More specifically, the support structure can be a $Ti_3O_5$—$Mo_{0.2}Si_{0.4}$ (TOMS) support structure and be used in various applications including, but not limited to, as a fuel cell catalyst support structure.

The introduction of Si as the second dopant generally has a favorable influence on the metal-support interaction to further enhance the ORR and durability of the $Ti_3O_5$—Mo-based support structure.

In at least one embodiment, the TOMS support structure can be used with a metal catalyst in a fuel cell. For instance, the metal catalyst can be arranged on top of the TOMS support structure. In at least one embodiment, the metal catalyst can be platinum or a platinum-based alloy. Hereinafter the terms a "Pt/TOMS support" or a "Pt/TOMS catalyst" will refer to a TOMS support structure with platinum or a platinum-based alloy arranged thereon.

In another aspect, a Pt/TOMS catalyst is also disclosed herein that generally provides improved activity towards the oxygen reduction reaction (ORR) when compared to a TOMS support structure and to a traditional PMS fuel cell catalyst. This improved activity may be attributed to a strong electronic interaction between the Pt nanoparticles and the TOMS support structure. Furthermore, this Pt/TOMS catalyst according to at least one aspect disclosed herein shows durability in accelerated stress tests, losing only 10% of its active surface area over the 5000 cycle accelerated stress test.

The TOMS support structure alone and the Pt/TOMS structure can be characterized by X-ray diffraction (XRD), UV-Visible spectroscopy, X-ray photoemission spectroscopy (XPS), transmission electron microscopy (TEM), and scanning electron microscopy (SEM). The electrochemical properties of each can be compared to those of a typical commercial electrocatalyst (e.g. 20% Pt/carbon).

Detailed structural analysis has been performed on the TOMS support structure and the Pt/TOMS catalyst. Referring now to FIG. 1A, shown therein is an XRD pattern obtained from the TOMS support structure. The presence of Mo appears to favor the formation of the titanium suboxides in a reducing environment that creates Ti cation oxygen vacancies or stoichiometric reduction of $Ti^{4+}$ to $Ti^{3+}$. The corresponding diffractogram shows that the support structure consists of a mixture of $Ti_3O_5$ phases with the main characteristic reflection at $2\theta=25.51°$, {110} and $Ti_6O$ at $2\theta=39.65$, with $Ti_3O_5$ being the prevailing phase. Mo is present either as metallic Mo (ICDD card no. 01-088-2331) or $MoO_2$ (ICDD card 00-021-0569). The $MoO_2$ appears to have a rutile-type crystal structure, in which $MO_6$ octahedra share cores and edges. $MoO_2$ has high electronic conductivity due to the short metal-metal bond distance along the direction of edge sharing. Both metallic Si (ICDD card no. 01-078-2500) and $SiO_2$ (ICDD card no. 00-046-1242) can be identified.

Referring now to FIG. 1B, shown therein is a XRD pattern obtained for the Pt/TOMS electrocatalyst, with metallic platinum present in a face-centered cubic (fcc) structure (ICDD card no. 01-087-0640), with typical reflections at $2\theta=40.61°$ {111}, 46.92° {200}, 68.1° {220}, and 81.81° {311}, and 86.43° {222}. All corresponding Pt peaks were shifted toward higher angles, indicating a diminution of the lattice spacing. This phenomenon may be attributed to the strong interaction between Pt and the TOMS support structure. Moreover, the peak at $2\theta=40.61°$ appears broad and intense, which may signify that the Pt NPs are greatly oriented towards the Pt {111} plane, which is the most stable and highly active toward the ORR which contains hexagonally packed Pt atoms and does not undergo surface reconstruction, unlike Pt {100} and Pt {110} surfaces. The size of Pt crystallites over the TOMS and carbon supports was calculated from the width of the {220} and {222} peaks using the Scherrer-Debye equation, resulting in a mean crystallite size of Pt equal to 4 and 2.5 nm for Pt/TOMS and Pt/C electrocatalysts, respectively.

FIG. 1C shows the optical band gap of commercial $TiO_2$ and the TOMS support structure measured through the absorption spectra of the diffuse reflectance of both the materials. The reflectance data has been converted into the absorption coefficient values followed by the creation of a Tauc plot. The band gap of the TOMS support structure was measured to be 0.31 eV, which appears to be lower than those of commercial $TiO_2$ (3.35 eV) and $Ti_3O_5$—Mo (2.6 eV). These measurements appear to indicate that the TOMS support structure has conductivity approaching that of a metal conductor.

The electrical conductivity of these materials has been measured using a 2-point probe and the values are listed in Table 1, below. The TOMS support structure shows an electrical conductivity of 0.11 S cm$^{-1}$, which is about two orders of magnitude higher than that of $Ti_3O_5$—Mo and only slightly lower than carbon black.

TABLE 1

Band gap and electronic conductivity of $TiO_2$, $Ti_3O_5$—Mo and TOMS

| | Band gap (eV) | Electronic conductivity (S cm$^{-1}$) |
|---|---|---|
| $TiO_2$ | 3.35 | $1.4 \times 10^{-6}$ |
| $Ti_3O_5$—Mo | 2.6 [ref. 17] | 0.004 |

TABLE 1-continued

Band gap and electronic conductivity of
$TiO_2$, $Ti_3O_5$—Mo and TOMS

| | Band gap (eV) | Electronic conductivity (S cm$^{-1}$) |
|---|---|---|
| TOMS | 0.31 | 0.11 |
| Carbon black | — | 0.83 |

Figure 2:
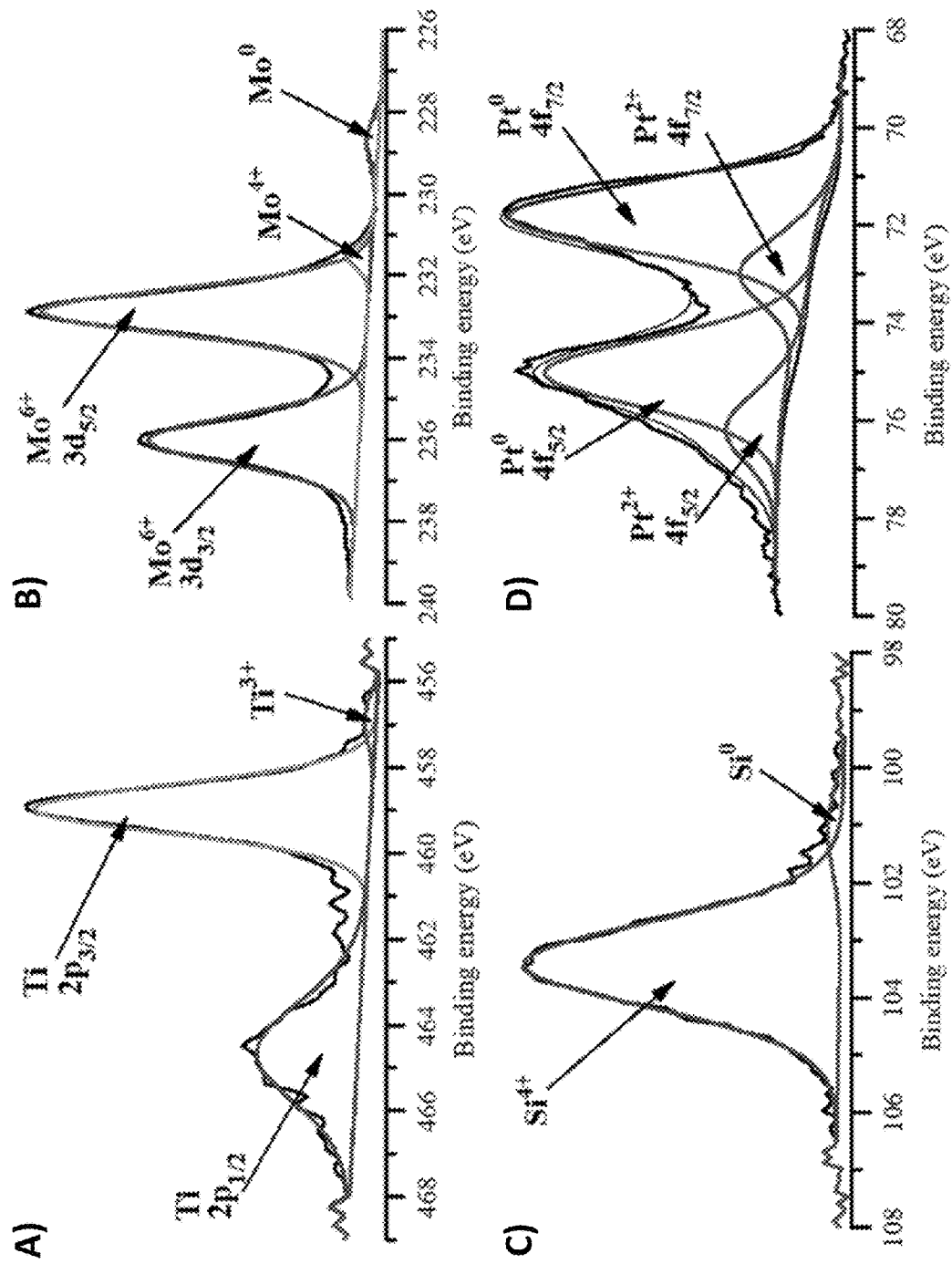
FIG. 2A is an XPS spectrum of the Pt/TOMS catalyst showing the composition of Ti.
FIG. 2B is an XPS spectra of the Pt/TOMS catalyst showing the composition of Mo.
FIG. 2C is an XPS spectra of the Pt/TOMS catalyst showing the composition of Si.
FIG. 2D is an XPS spectra of the Pt/TOMS catalyst showing the composition of Pt.

The electronic interaction between Pt and the TOMS support structure and the chemical state of Ti, Mo, Si, and Pt were investigated by using XPS spectra and the results are shown in FIG. 2. The presence of Ti suboxides on the surface of the support is confirmed by the $Ti^{3+}$ peak located at a low binding energy of 456.86 eV (see FIG. 2A). Also, the Ti double peaks of 2p1/2 and 2p3/2 levels were located at binding energies of 464.67 eV and 458.97 eV, respectively. Pure $TiO_2$ shows the Ti double peaks of 2p1/2 and 2p3/2 levels at 464.2 eV and 458.5 eV binding energies, while the reduced form (e.g. Magneli phase) has binding energies of 464.7 eV and 459.0 eV. The shift in the Ti 2p levels compared to defect-free $TiO_2$ is caused by surface oxygen vacancy defects in the TOMS support structure. The incorporation of Mo and Si into the $TiO_2$ lattice appears to create these oxygen vacancies resulting in the change of energy difference between the conduction and valence bands. Therefore, the shifting of Ti 2p levels towards higher binding energies may be attributed to the reduced Ti due to combined effects between molybdenum and Si with $TiO_2$ which resulted in oxygen vacancies and Ti suboxide formation.

The Mo spectrum has peaks associated with $Mo^{6+}$, $Mo^{4+}$ and $Mo^0$ (see FIG. 2B): Mo is largely present in the form of $MoO_x$ on the surface of the TOMS support structure, with traces of metallic Mo. The Si spectrum has peaks associated with $Si^{4+}$ and $Si^0$ (see FIG. 2C): also, Si is largely present in the form of $SiO_x$ on the surface of the TOMS support structure (in agreement with XRD analysis), with traces of metallic Si on the surface. The Pt analysis appears to demonstrate spin-orbit splitting doublet peaks in the 4f region referring to 4f7/2 and 4f5/2, where the deconvolution of the Pt spectrum reveals two pairs of doublet peaks in each region. The high intensity doublet peaks at the binding energies of 71.75 eV and 75.1 eV, respectively, appear to be attributed to metallic Pt ($Pt^0$). The low-intensity doublet peaks at binding energies of 72.95 eV and 76.3 eV, respectively, appear at a binding energy 1.2 eV higher than that of $Pt^0$, assigned to Pt2+ species due to surface oxide/hydroxide (see FIG. 2D). The binding energy of 71.75 eV for Pt0 4f7/2 reveals 0.75 eV positive shifts towards higher binding energy compared to the 4f7/2 conventional value of Pt/C. This shift to higher binding energy corresponds to induced positive charge on the dispersed Pt NPs due to the interaction between Pt NPs and the TOMS support structure which positively influenced the d-band state of Pt NPs. This effect, which is also in line with the XRD results, shows an enhanced interfacial strong electronic interaction between the TOMS support structure and Pt NPs. This electron donation from the TOMS support structure to Pt NPs, due to the strong metal-support interaction (SMSI), is expected to enhance the electroactivity of Pt/TOMS.

Figure 3:
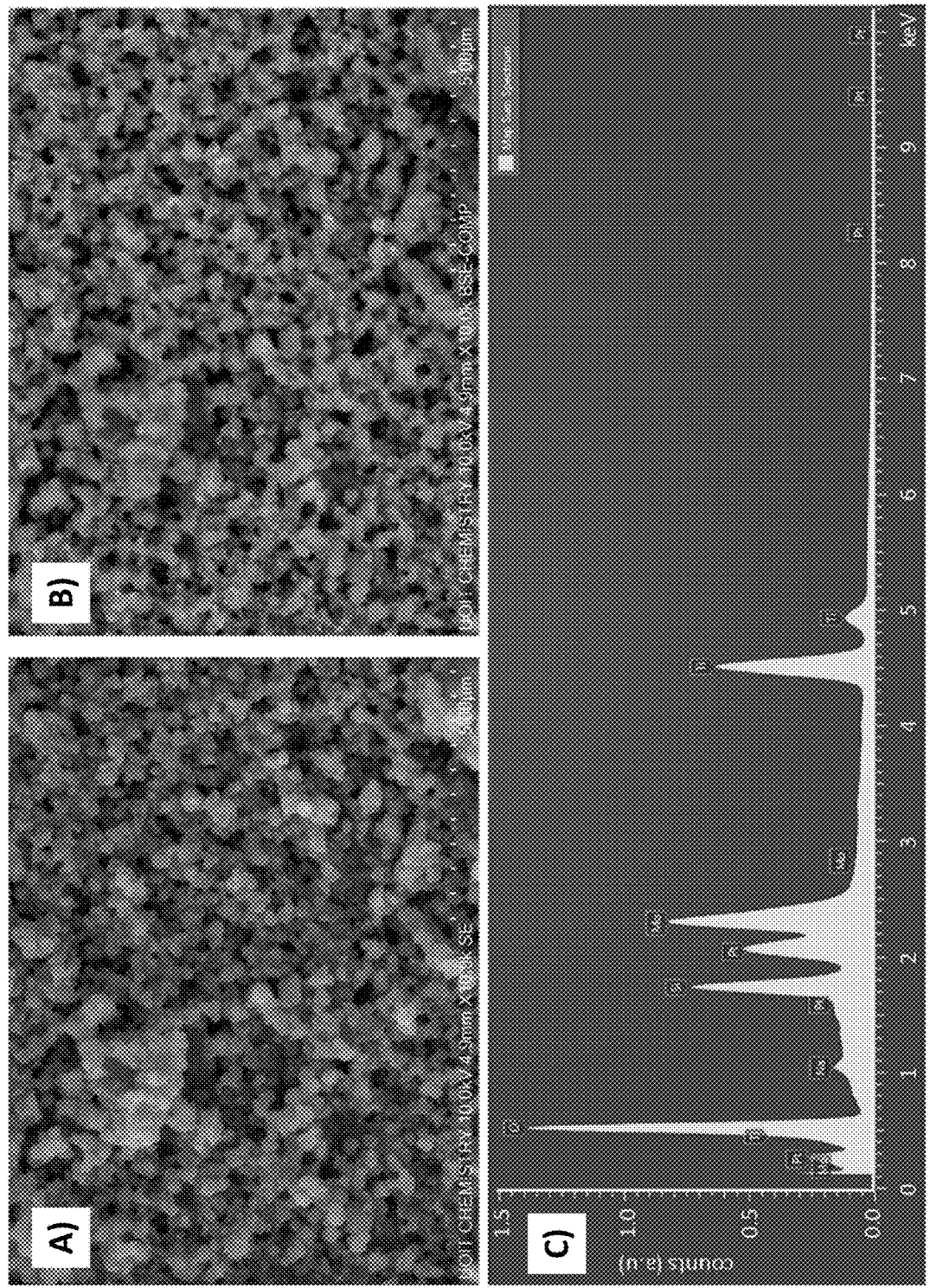
FIG. 3A shows a secondary electron image of the Pt/TOMS elecrocatalyst.
FIG. 3B shows a back scattered electron image of the Pt/TOMS electrocatalyst.
FIG. 3C shows an EDX analysis of the Pt/TOMS electrocatalyst.

FIG. 3 displays SEM images of Pt/TOMS, along with the corresponding energy dispersive X-ray spectra (EDX). The particles are spherical in nature, and fairly homogeneous in their shape and composition. The EDX spectrum confirms the presence of Si and Mo in the Pt/TOMS electrocatalyst.

Figure 4:
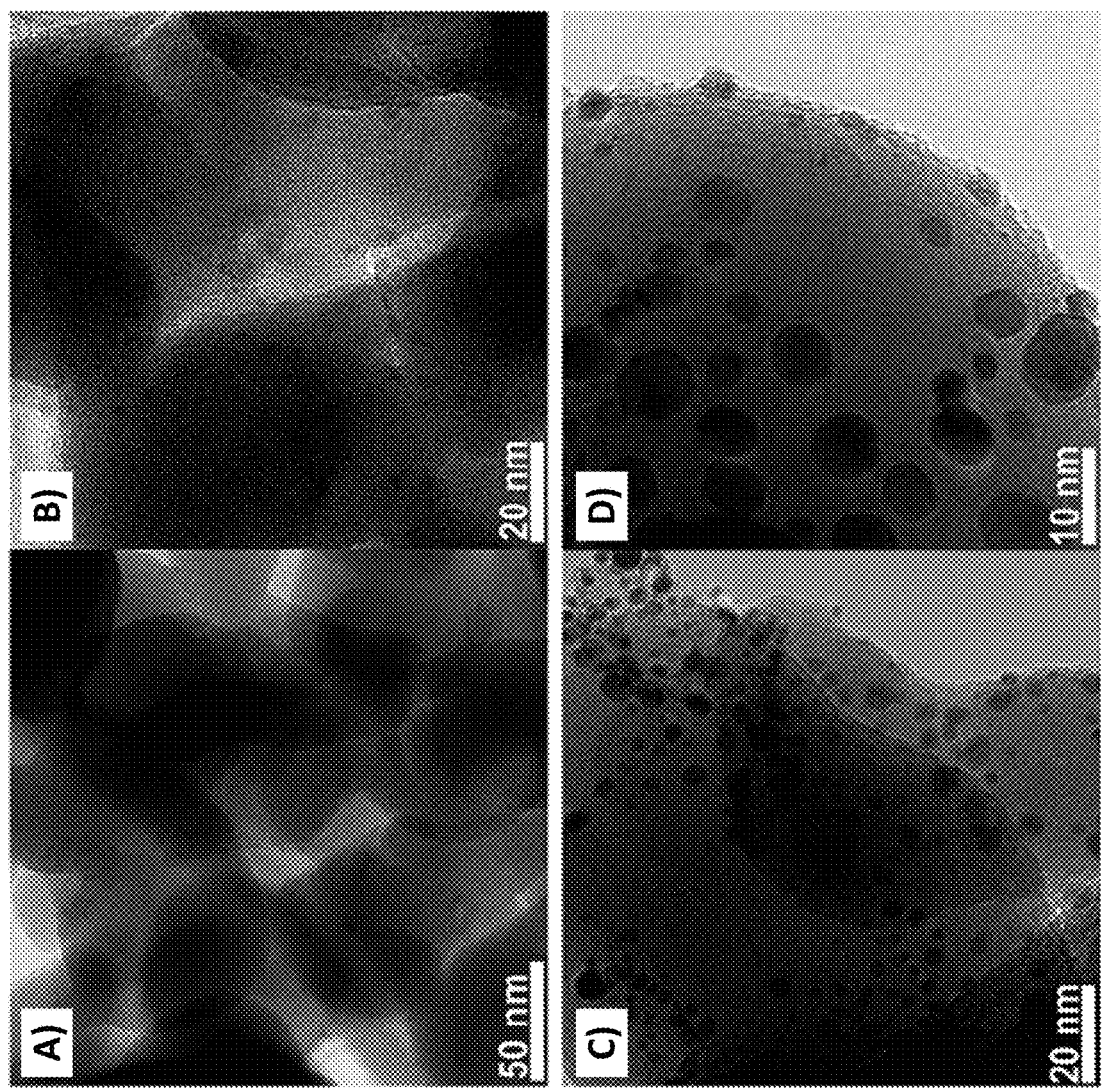
FIGS. 4A and 4B show TEM images of the TOMS support structure at different magnifications.
FIGS. 4C and 4D show TEM images of the Pt/TOMS electrocatalyst at different magnifications.

FIG. 4 shows the TEM images obtained for TOMS and Pt/TOMS at different magnifications. The Pt NPs appear to be well dispersed over the TOMS support structure and are clearly identifiable from TEM images.

Figure 5:
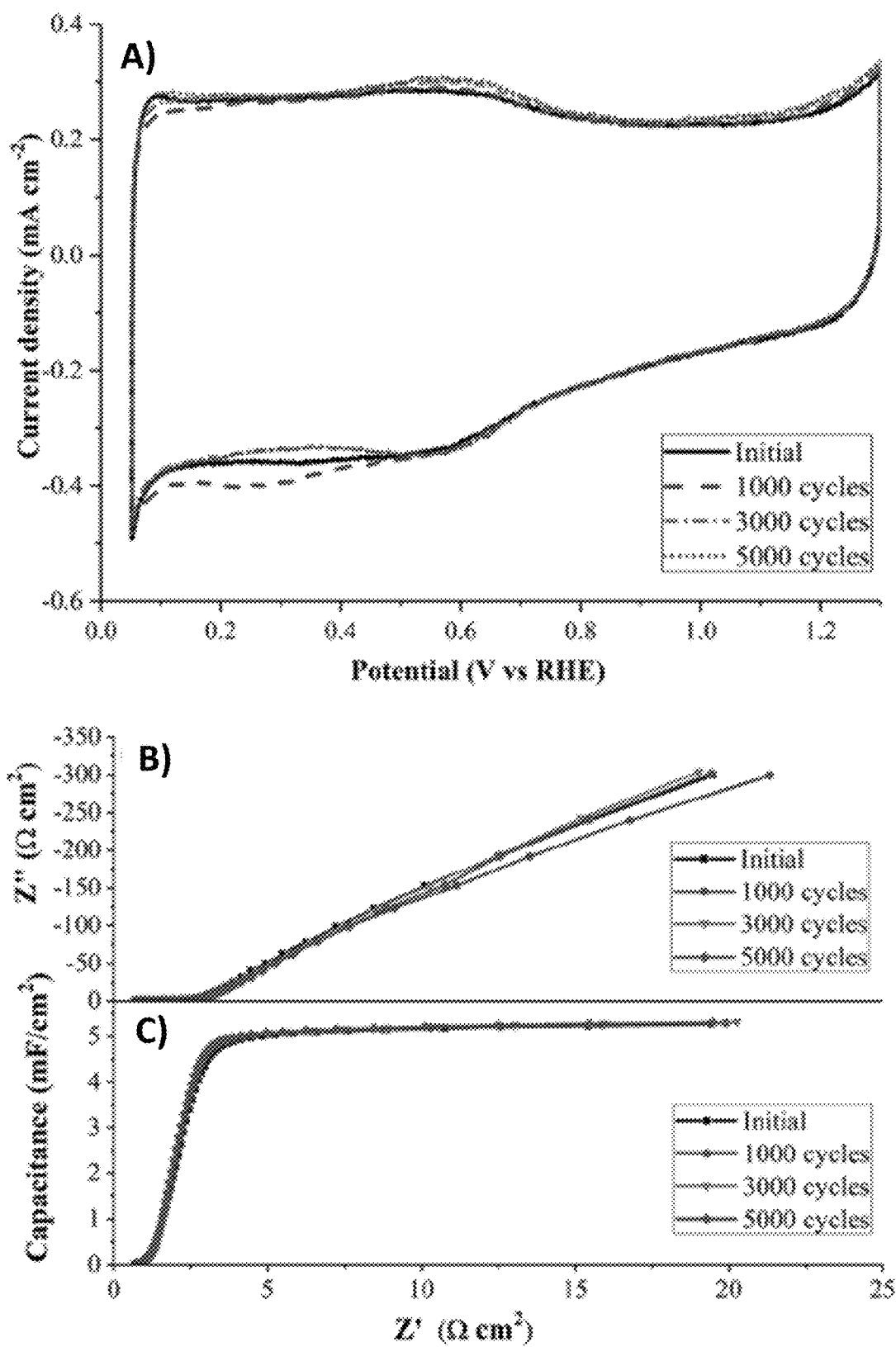
FIG. 5A is a chart showing variation in the cyclic voltammetry (CV) response of the TOMS support structure.
FIG. 5B is a Nyquist plot of the TOMS support structure.
FIG. 5C is a capacitance plot of the TOMS support structure obtained at a DC bias potential of 0.425 V vs. RHE.

FIG. 5A presents the variation in the CV profile of the TOMS support structure at various points in the AST. The CV curves have rectangular shapes with small reversible redox peaks at 0.6 V vs v RHE, typical for pseudo-capacitive materials. The TOMS support structure appears to remain stable, showing virtually no change over the course of 5000 cycles, giving no indication of Ti, Mo, and Si oxidation/corrosion.

FIG. 5B shows Nyquist plots obtained from the TOMS support structure at different stages during the durability test. Relatively short Warburg regions were observed which confirms that the TOMS layer has good electronic conductivity. The shape of the Nyquist plots was unchanged over the course of the AST, which is indicative of no change in either the electronic or ionic conductivity during the AST. Furthermore, the capacitance plots (see FIG. 5C) showed no change over the course of the 5000 cycles, indicating that the surface area of the TOMS support structure was unchanged and remained stable during the AST.

Figure 6:
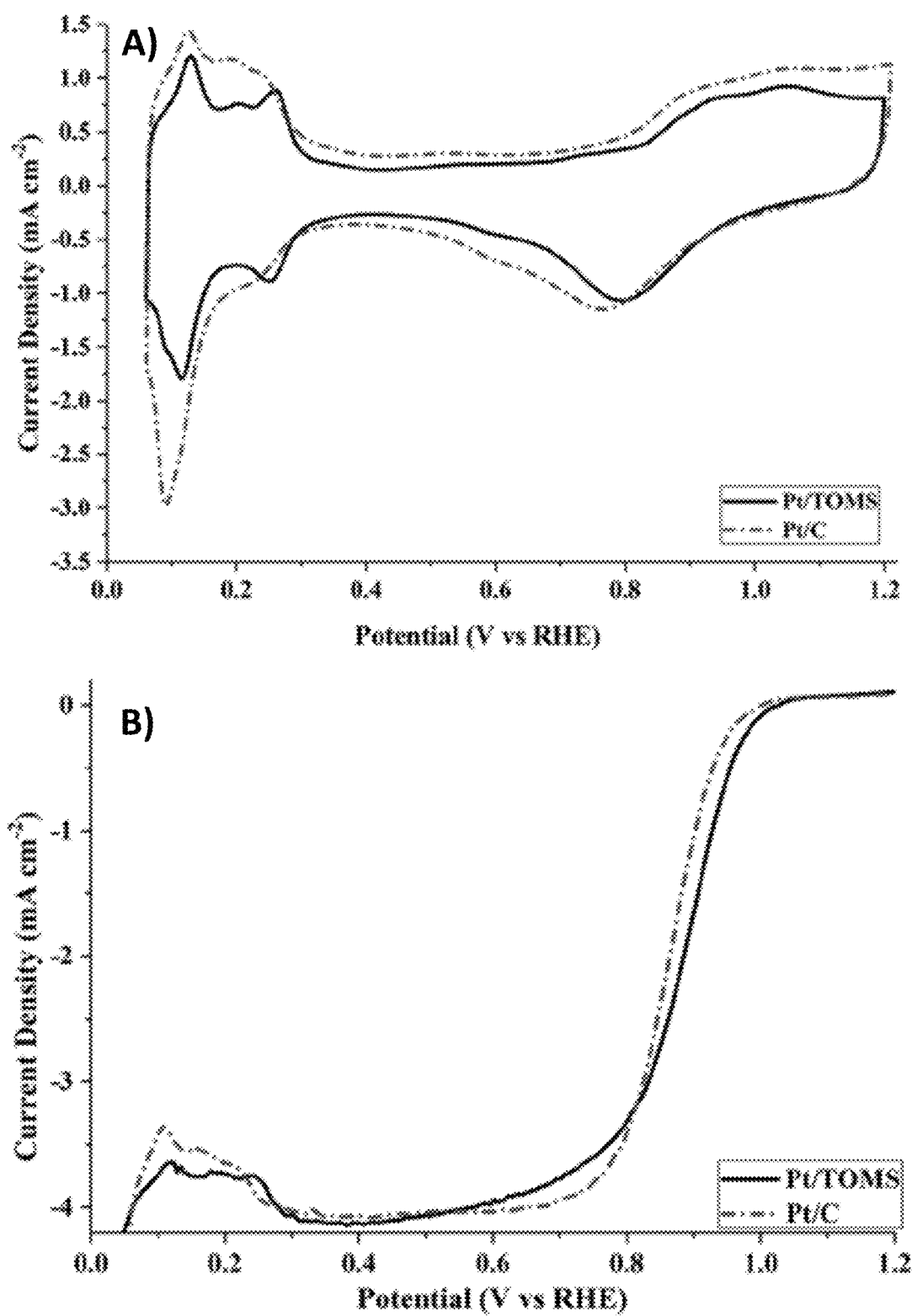
FIG. 6A shows a comparison of the CVs obtained for Pt/TOMS and Pt/C recorded in $N_2$-purged 0.5 m $H_2SO_4$ at 25° C. and a scan rate of 10 mv $s^{-1}$.
FIG. 6B shows a comparison of the ORR activity of Pt/TOMS and Pt/C recorded in $O_2$-saturated 0.5 m $H_2SO_4$ at 25° C. and a scan rate of 5 mv $s^{-1}$ and 900 rpm.

FIG. 6A compares the CVs obtained for the Pt/TOMS and the commercial Pt/C catalysts. Both electrocatalysts exhibit the classical Pt CV shape, three anodic peaks and two cathodic peaks with good reversibility in the hydrogen region assigned to the uniformly dispersed polycrystalline Pt NPs over the surface of the TOMS support structure. The Pt/TOMS showed earlier reduction of adsorbed Pt oxides compared to Pt/C. The ECSA of each electrocatalyst was determined by integrating the charge associated with HUPD (210 µC $cm_{Pt}^{-2}$), and the values are listed in Table 2. Also listed in Table 2 are the reported ECSA values for several other catalysts that employ metal oxide-based supports. The Pt/TOMS catalyst had a very high ECSA value of 87 m$^2$ $g_{Pt}^{-1}$, which is one of the highest values reported in the literature for metal oxide containing supports. This confirms that catalyst particles are well dispersed onto the TOMS support structure. Furthermore, it also indicates that the catalyst layer created from Pt/TOMS creates a very high degree of accessibility to Pt active sites.

TABLE 2

Electrochemical characterization of electrocatalysts

| Catalyst | Pt [mg cm$^{-2}$] | ECSA [m$^2$ g$^{-1}$] | I@0.9 [mA mg$_{Pt}^{-1}$] | I@0.9 [mA cm$^{-2}$] | Media | ECSA loss, cycle, scan rate [mV s$^{-1}$] | Ref |
|---|---|---|---|---|---|---|---|
| Pt/TOMS | 0.025 | 87.33 | 86.5 | 1.57 | 0.5M H$_2$SO$_4$ | 10.2%, 5000, 50 | Current study |
| Pt/C | 0.01 | 98.67 | 31.7 | 0.95 | 0.5M H$_2$SO$_4$ | 79.4%, 5000, 50 | Current study |
| Pt/Ti$_3$O$_5$—Mo | 0.015 | 22.3 | 85.2 | 1.1 | 0.5M H$_2$SO$_4$ | 11.2%, 5000, 50 | 17 |
| Pt/Ti$_{0.2}$—Mo$_{0.3}$O$_2$ | 0.221 | 81.07 | 3.17 | 0.05 | 0.5M H$_2$SO$_4$ | — | 67 |
| Pt/TiB$_2$ | 0.075 | 34.7 | 3.4 | 0.2 | 0.5M H$_2$SO$_4$ | 58.8%, 5000, 20 | 68 |

TABLE 2-continued

Electrochemical characterization of electrocatalysts

| Catalyst | Pt [mg cm$^{-2}$] | ECSA [m$^2$ g$^{-1}$] | I@0.9 [mA mg$_{Pt}^{-1}$] | I@0.9 [mA cm$^{-2}$] | Media | ECSA loss, cycle, scan rate [mV s$^{-1}$] | Ref |
|---|---|---|---|---|---|---|---|
| Pt/TiO$_2$—CN$_x$ | — | 75 | 3.10 | — | 0.3M H$_2$SO$_4$ | 3%, 1000, 100 | 14 |
| Pt/Ti$_{0.2}$Mo$_{0.3}$O$_2$ | 0.221 | 72.5 | | 0.8 | 0.5M H$_2$SO$_4$ | — | 21 |
| Pt/Ta—TiO$_2$ | 0.038 | 36.5 | 21 | 0.45 | 0.1M HClO$_4$ | 26.3%, 10000, 20 | 69 |
| Pt/Nb—TiO$_2$ | 0.087 | 36 | 2.4 | 0.15 | 0.1M HClO$_4$ | 25%, 1000, 100 | 70 |
| Pt/Ti$_2$O$_7$ | 0.0478 | 6 | 3.13 | 0.2 | 0.1M HClO$_4$ | 28%, 1000, 20 | 71 |

FIG. 6B compares the ORR activity of Pt/TOMS and Pt/C catalysts. The Pt/TOMS electrocatalyst exhibits excellent ORR activity, with a high onset potential for O$_2$ reduction as well as a high half-wave potential of 0.9 V vs. RHE (compared to a halfwave potential of 0.86 V vs. RHE for the commercial Pt/C). The Pt/TOMS produced 1.57 mA cm$^{-2}$ at 0.9 V vs. RHE compared to only 0.95 mA cm$^{-2}$ for Pt/C. Furthermore, this appears to represent an improvement over the ORR activity reported for Pt/Ti$_3$O$_5$—Mo (1.1 mA cm$^{-2}$ at 0.9 V). Such an enhancement in ORR activity may correlated with the change in the Pt—Pt interatomic distance. In fact, the distinctive electroactivity of Pt/TOMS compared to Pt/C is defined through changes in the Pt d-band length and smaller lattice parameter values induced by the metallic suboxide support and formation of hydrogen molybdenum bronze, which effectively promotes the direct 4-electron transfer ORR on the Pt/TOMS. The reduction of the Pt d-bond length is due to the SMSI between the TOMS support structure and Pt NPs that weakens the interaction between Pt and the adsorbed oxygenated species that leads to higher electroactivity of Pt/TOMS compared with that of the commercial Pt/C catalyst. Since the TOMS support structure makes a stable Pt NP surface at high electrochemical potentials, the Pt/TOMS appears to possess a lower kinetic barrier for the ORR compared to Pt/C which is a key kinetic parameter for ORR activity. A summary of key electrochemical parameters and a comparison to the ORR activity of other catalysts that employ metal oxide based supports is shown in Table 2.

Figure 7:
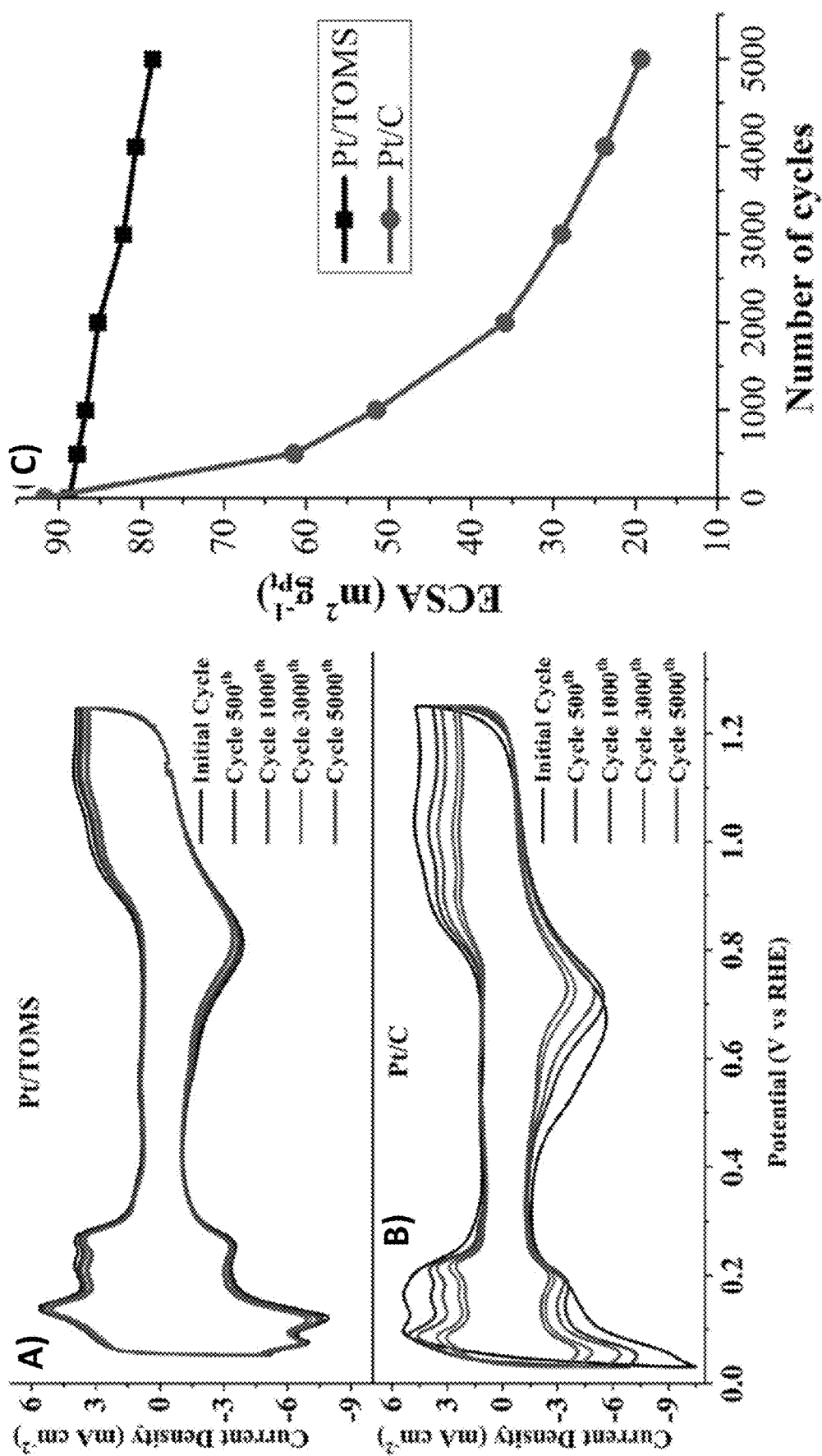
FIG. 7A shows variation in the CV response of Pt/TOMS during the AST with measurements being made in $N_2$-purged 0.5 m $H_2SO_4$ (aq) at 25° C. at a sweep rate of 50 mv $s^{-1}$.
FIG. 7B shows variation in the CV response of commercial Pt/C during the AST with measurements being made in $N_2$-purged 0.5 m $H_2SO_4$ (aq) at 25° C. at a sweep rate of 50 mv $s^{-1}$.
FIG. 7C shows variation in ECSA with number of potential cycles for each catalyst.

Beside high electrocatalytic activity, the durability of the electrocatalysts is an important characteristic to identify the influence of electrochemical variation over potential cycling and its influence and contribution to the loss of ECSA and consequently the electrocatalyst activity. The AST was conducted by subjecting both the Pt/TOMS and commercial Pt/C electrocatalysts to 5000 potential cycles in the range of 0.05-1.25 V vs. RHE. Referring now to FIG. 7, shown therein is a comparison of the change in the CV response with potential cycling for each catalyst. As the test progressed, the Pt/TOMS remained quite stable, while the Pt/C decayed rapidly (see FIGS. 7A and 7B). For the Pt/TOMS electrocatalyst, the decay in ECSA after 5000 ASTs was 10.2% while Pt/C showed an ECSA decay of 79.4%. This durability for the Pt/TOMS catalyst appears to be a result of the ability of the support structure to mitigate the segregation of Pt NPs, which implies that Pt NPs anchor to the surface of the TOMS support structure through the SMSI that leads to improvement in both electroactivity and stability of the Pt catalyst.

Figure 8:
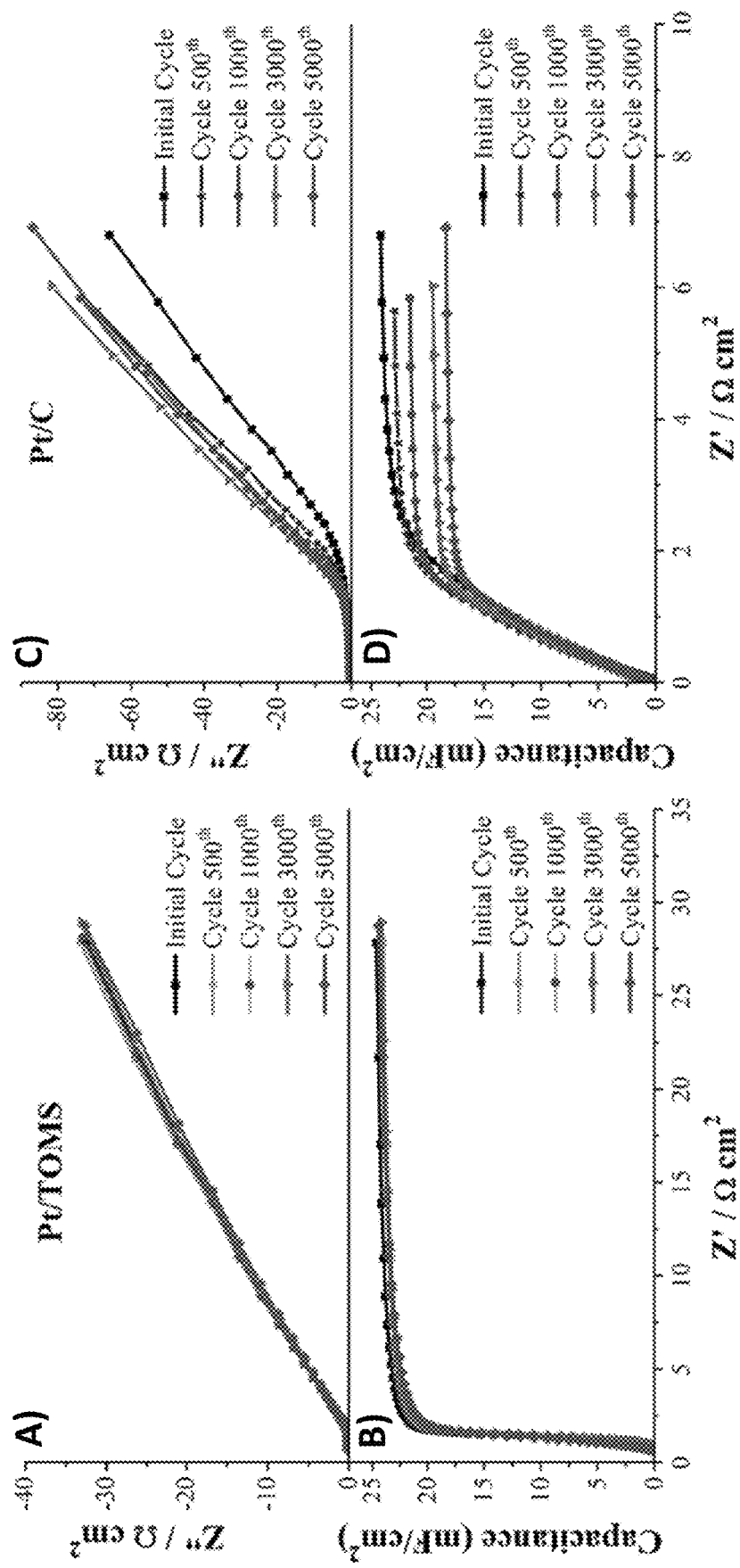
FIG. 8A shows variation in the EIS response obtained by Pt/TOMS during the AST, shown as Nyquist plots.
FIG. 8B shows variation in the EIS response obtained by Pt/TOMS during the AST, shown as capacitance plots.
FIG. 8C shows variation in the EIS response obtained by Pt/C during the AST, shown as Nyquist plots.
FIG. 8D shows variation in the EIS response obtained by Pt/C during the AST, shown as capacitance plots.

FIG. 8 shows the EIS response for Pt/TOMS and commercial Pt/C electrocatalysts, shown as Nyquist and capacitance plots. The Nyquist and capacitance plots obtained for Pt/TOMS were virtually unchanged over the course of the AST. This appears to indicate that excellent ionic and electronic conductivities were maintained throughout the test, and that there was no decay or corrosion of the TOMS support structure. For the Pt/C catalyst, a small increase in the Warburg length was observed over the course of the AST, indicating a small increase of the catalyst layer resistance due to carbon corrosion. The capacitance plots for Pt/C showed an initial increase in limiting capacitance, which is most likely due to incomplete wetting of the Pt/C electrocatalyst surface at the initial stage of the measurements. Upon cycling, the capacitance plots for Pt/C showed decrease in limiting capacitance, which is the characteristic response when Pt dissolution and agglomeration are the dominant degradation mechanisms.

Figure 9:
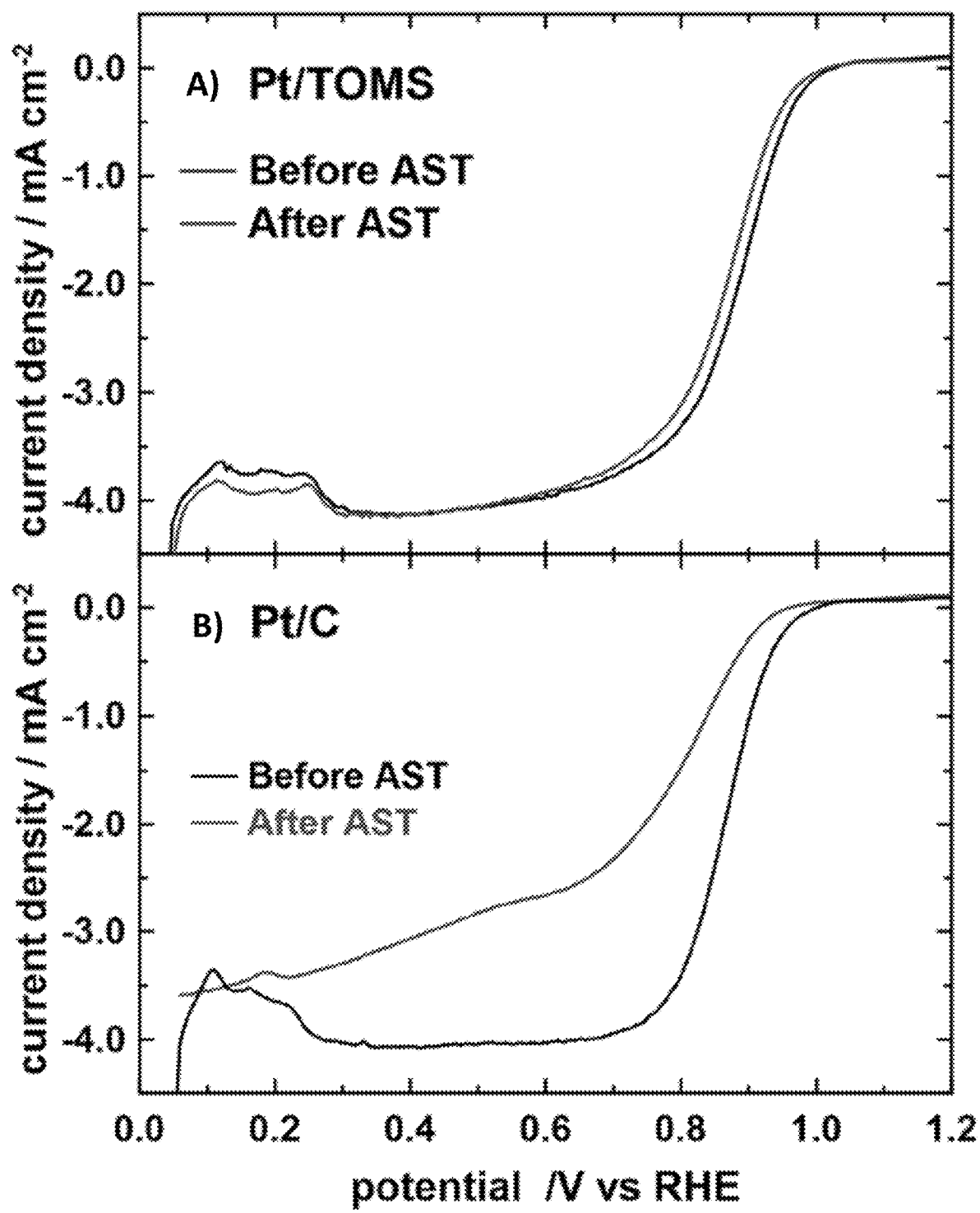
FIG. 9A shows a comparison of the ORR activity of the Pt/TOMS catalysts before and after the 5000 cycle AST.
FIG. 9B shows a comparison of the ORR activity of the Pt/C catalysts before and after the 5000 cycle AST.

To further examine the impact of the AST on the catalysts, ORR activity was reassessed repeatedly for both electrocatalysts after the completion of the AST procedure protocol (see FIG. 9). As expected, there was very little change in ORR activity for the Pt/TOMS catalyst, while a decline in ORR activity was observed for Pt/C due to sintering and agglomeration of Pt NPs. These results appear to show that the Pt/TOMS catalyst layer remained stable over the course of the AST and there was essentially no change in the elemental distribution of the Pt/TOMS catalyst layer components after the AST.

Figure 10:
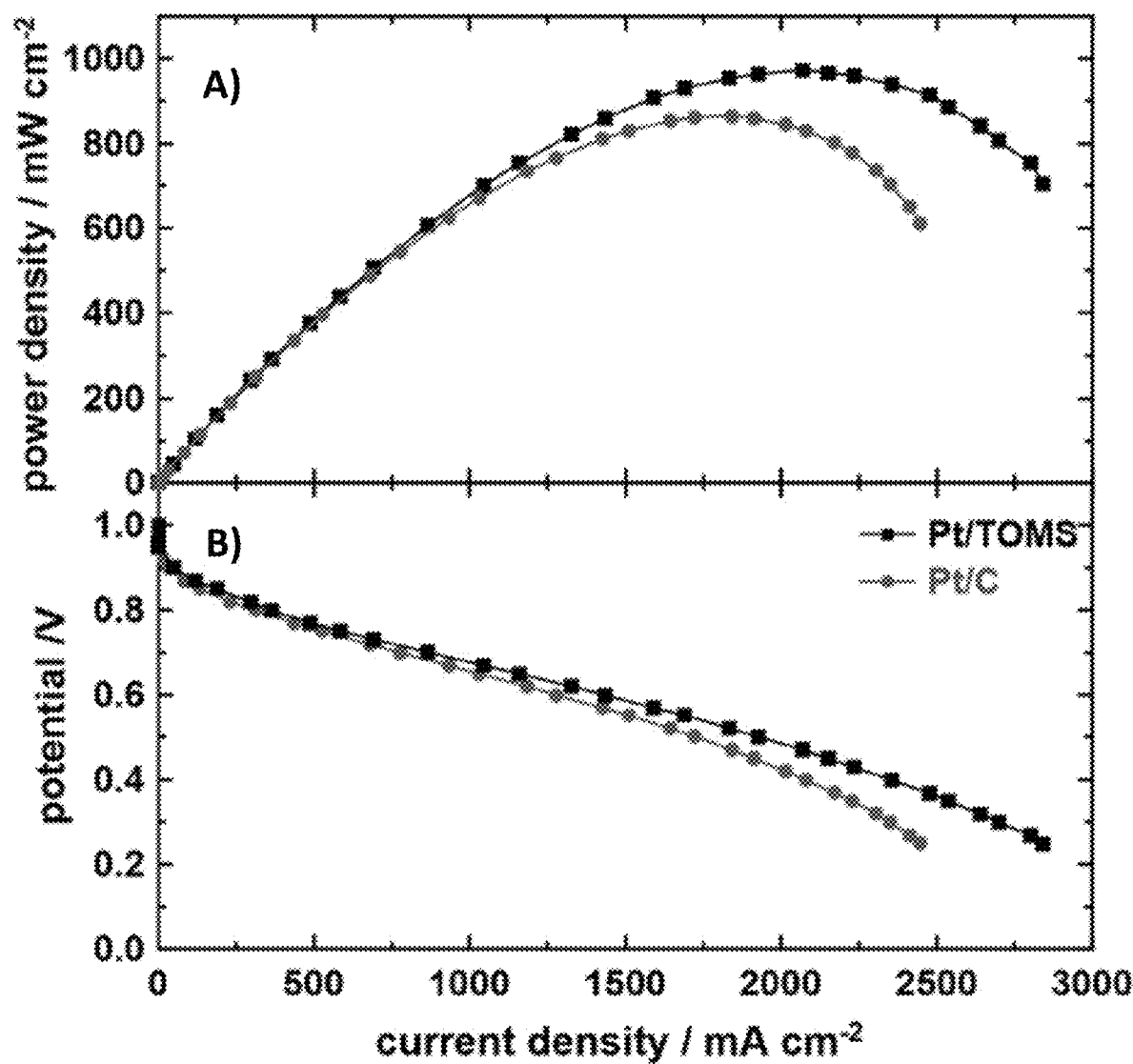
FIG. 10A shows a comparison of the fuel cell performance obtained using the Pt/TOMS and Pt/C electrodes with data being shown in as a power density curve where measurements were made in a 5 $cm^2$ single cell PEMFC at 80° C., using a Pt loading of 0.2 mg $cm^{-2}$, $H_2$ flow rate of 100 nml $min^{-1}$ 100% rh 1 bar bp; $O_2$ flow rate 200 nml $min^{-1}$ 100% rh 1 bar bp, and membrane=NRE212.
FIG. 10B shows a comparison of the fuel cell performance obtained using the Pt/TOMS and Pt/C electrodes with data being shown in as a polarization curve where measurements were made in a 5 $cm^2$ single cell PEMFC at 80° C., using a Pt loading of 0.2 mg $cm^{-2}$, $H_2$ flow rate of 100 nml $min^{-1}$ 100% rh 1 bar bp; $O_2$ flow rate 200 nml $min^{-1}$ 100% rh 1 bar bp, and membrane=NRE212.
Figure 11:
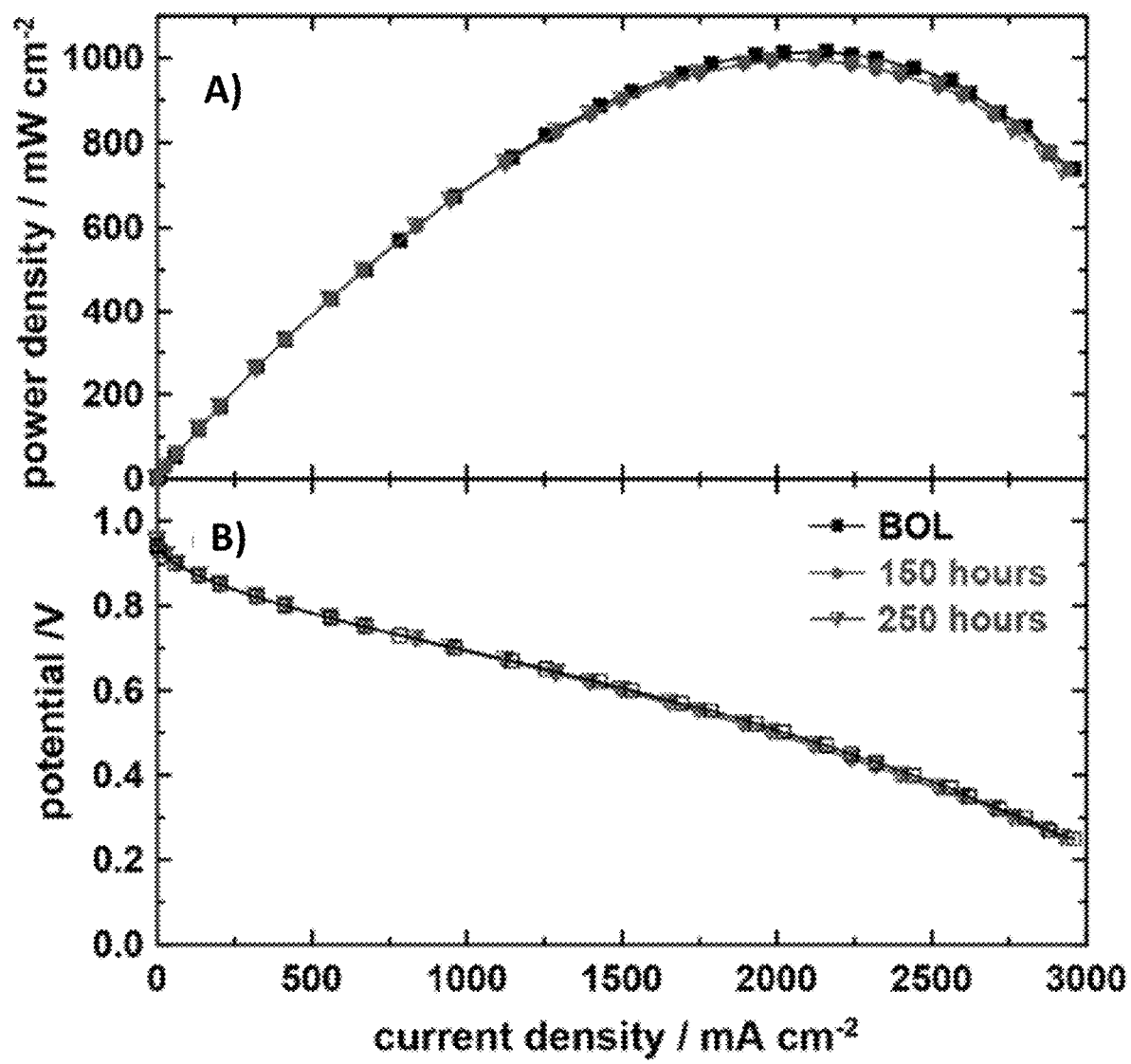
FIG. 11A shows fuel cell performance stability testing of the Pt/TOMS membrane electrode assembly (MEA) where data being obtained at the beginning of life (BOL) and after 150 h and 250 h of testing and shown as a power density curve with measurements being made in a 5 $cm^2$ single cell PEMFC at 80° C., using a Pt loading of 0.2 mg $cm^{-2}$, $H_2$ flow rate of 100 nml $min^{-1}$ 100% rh 1 bar bp; $O_2$ flow rate 200 nml $min^{-1}$ 100% rh 1 bar bp, and membrane=NRE212.
FIG. 11B shows fuel cell performance stability testing of the Pt/TOMS membrane electrode assembly (MEA) where data being obtained at the beginning of life (BOL) and after 150 h and 250 h of testing and shown as a polarization curve with measurements being made in a 5 $cm^2$ single cell PEMFC at 80° C., using a Pt loading of 0.2 mg $cm^{-2}$, $H_2$ flow rate of 100 nml $min^{-1}$ 100% rh 1 bar bp; $O_2$ flow rate 200 nml $min^{-1}$ 100% rh 1 bar bp, and membrane=NRE212.

FIG. 10 compares the fuel cell performance achieved using Pt/TOMS electrodes with that obtained using Pt/C electrodes. The Pt/TOMS and Pt/C electrodes produced a maximum power density of 973 and 865 mW cm$^{-2}$, respectively. This is consistent with the obtained results from ORR activity and appears to demonstrate that the Pt/TOMS catalyst material is more durable than Pt/C and outperforms Pt/C catalysts at the beginning of life. The power density of Pt/TOMS appears to be associated with the charge transfer between Pt and the TOMS support structure which appears to cause the enhancement of the oxygen reduction kinetics. The obtained results confirmed that the support material influences the activity of electrocatalysts by promoting the diffusion of reactants and products, and this translates into higher performance in an operating fuel cell. Moreover, the stability of Pt/TOMS MEA was assessed over the course of 250 hours of operation. FIG. 11 shows a comparison of the fuel cell performance at the start of the test to that obtained at the end of 250 hours. Minimal change in the performance was observed, with the polarization curves being virtually unchanged. This demonstrates that Pt/TOMS remained stable during the durability test and enhanced stability of the TOMS support structure translates into better long-term performance in an operating fuel cell.

Figure 12:
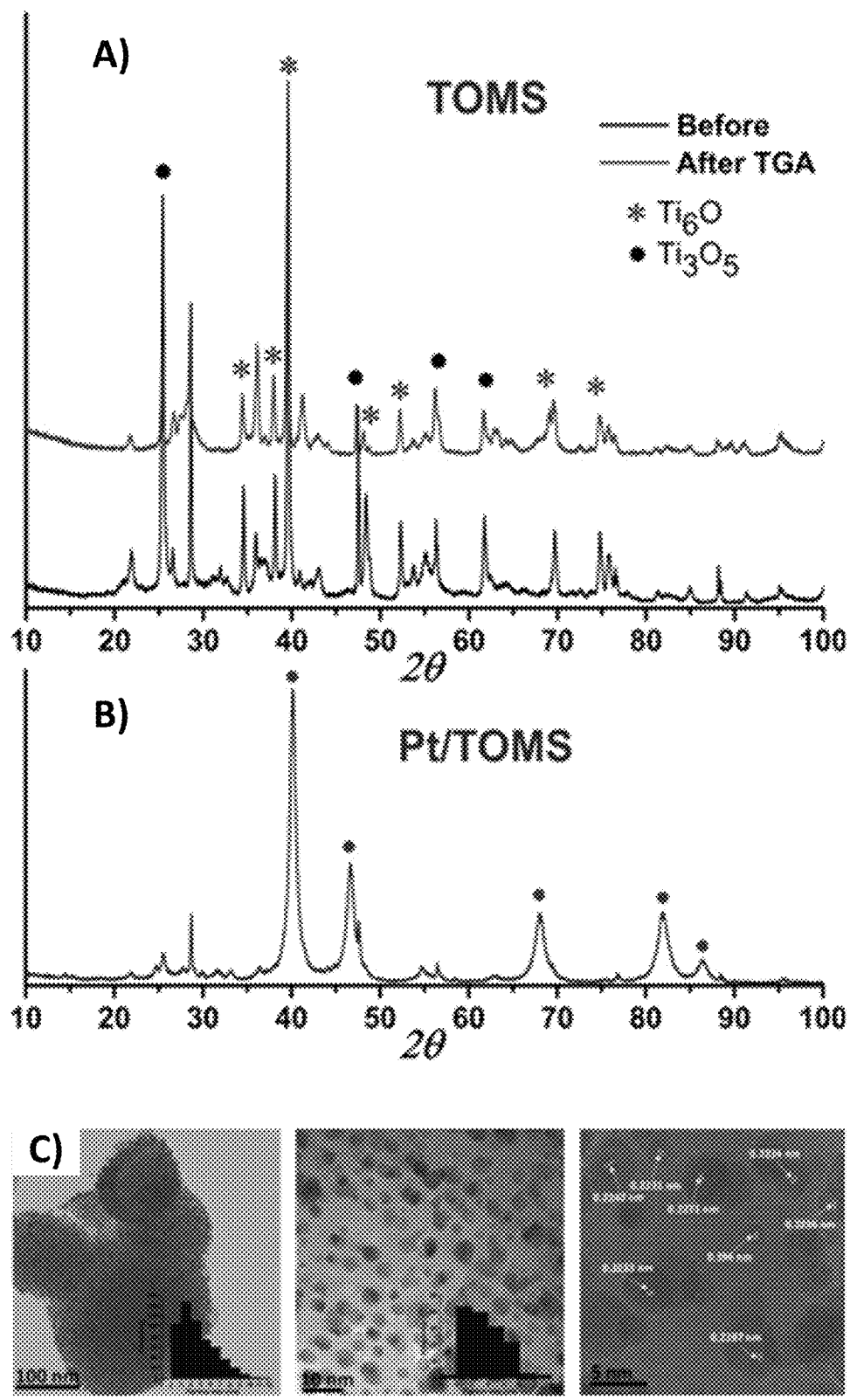
FIG. 12A shows the XRD pattern obtained for TOMS support before and after TGA analysis.
FIG. 12B shows the XRD pattern of the Pt/TOMS electrocatalyst.
FIG. 12C shows TEM images at different magnifications corresponding to the Pt/TOMS electrocatalyst.

To evaluate the thermal stability of the supports, thermogravimetric analysis (TGA) was performed on both the TOMS and Vulcan XC72 carbon supports in an inert atmosphere. Unlike the carbon which exhibited degradation after 450° C., the TOMS support showed very stable trend with no mass variation over the temperature range of the TGA test, assign to stable carbonaceous-free material. Detailed structural analysis was performed on TOMS structure before and after the TGA test. FIG. 12A shows the post-XRD pattern obtained from the TOMS support after TGA test exhibit no changes in the $Ti_6O$ and $Ti_3O_5$ prevailing phases. FIG. 12B shows the XRD pattern obtained for the Pt/TOMS electrocatalyst, with metallic platinum present in a face-centered cubic (fcc) structure (ICDD card no. 01-087-0640). All corresponding Pt peaks were shifted toward higher angles, indicating a reduction of the lattice d-spacing of Pt atoms. The crystalline lattice parameter of Pt was calculated using Bragg's law applied to the Pt {111}, {200}, {220}, {311}, and {222} planes, resulting in 2.2539 Å, 1.9498 Å, 1.3805 Å, 1.1759 Å, and 1.1298 for $d_{111}$, $d_{200}$, $d_{220}$, $d_{311}$, and $d_{222}$-spacing, respectively. Compared to bulk Pt, the d-spacing of Pt/TOMS were exhibited lower values due to strong interaction between the Pt and TOMS support. Moreover, the peak at 2θ=40.52 is broad and intense, which indicates that the Pt NPs are greatly oriented towards the Pt {111} plane. The size of Pt NPs over the TOMS support was calculated from the width of the {220} and {222} peaks using the Scherrer-Debye equation, resulting in a mean crystallite size of Pt equal to 4 nm.

FIG. 12C shows TEM images obtained for the Pt/TOMS at different magnifications. The Pt NPs are well dispersed over the TOMS support, where the TEM (HRTEM) image showed Pt NPs were dominated by octahedron {111}-d-spacing of about 0.223 nm, and {200}-d-spacing of about 0.194 nm (in agreement with XRD). It has been well documented the catalytic activity of Pt-based electrocatalysts strongly depends on their crystal facets, in this regard Pt {111} is the most active and stable facet, which can provide optimal binding energy between platinum atoms and the adsorbed species for ORR, which also, does not undergo surface reconstruction, unlike Pt {100} and Pt {110} surfaces.

The ex-situ and in-situ electrochemical stability of the supports and catalysts were evaluated using ASTs that involved repeated cycling of the working electrode based on triangular-wave or rectangular-wave form at different potential range according to protocols developed by US Department of Energy. Both of the Pt/TOMS and commercial Pt/C catalysts were subjected to seven of the most advanced/common AST protocols reported in literature different. The details for each of these AST protocols are listed in in Table 3.

These protocols probe (i) support stability against corrosion, (ii) impact of catalyst degradation due to dissolution/Ostwald ripening, (iii) impact of support corrosion (under startup-shutdown potential) on Pt NPs agglomeration/dissolution and consequently catalyst deactivation rate. During stability test the electrodes condition were monitored by periodic CVs and EIS assessments. Also, ORR activity of each catalyst was assessed before and after the ASTs at 25° C.

AST Protocol (I): Ex-Situ Support Stability

Figure 13:
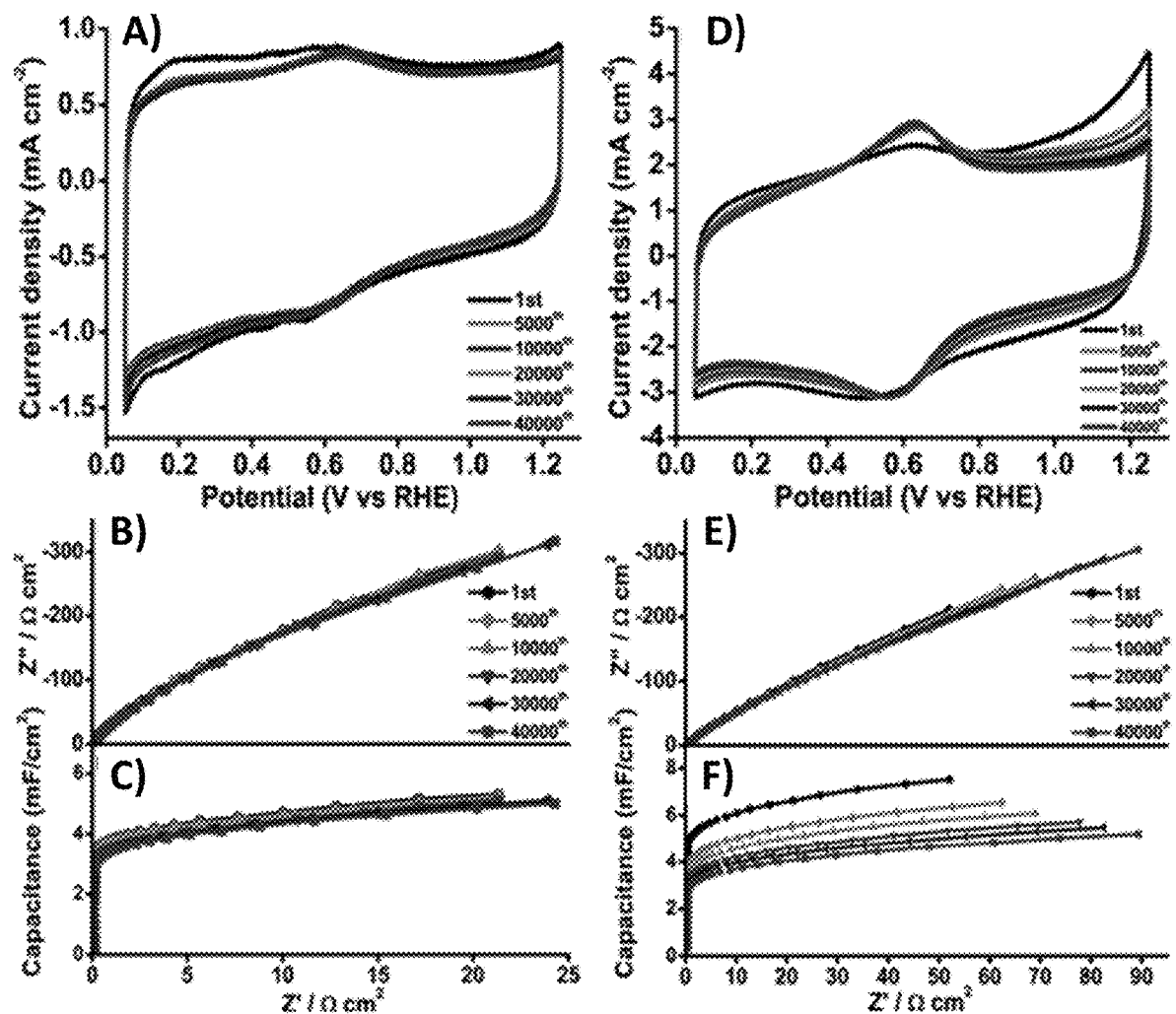
FIG. 13A shows variation in the CV response of the TOMS support.
FIGS. 13B and 13C show Nyquist and capacitance plots, respectively, of TOMS obtained at a DC bias potential of 0.8 $V_{RHE}$.
FIG. 13D shows variation in the CV response of the carbon support.
FIGS. 13E and 13F show Nyquist and capacitance plots, respectively, of carbon obtained at a DC bias potential of 0.8 $V_{RHE}$.

The ex-situ support stability test on TOMS and carbon Vulcan were assessed through the AST protocol (I). FIG. 13A shows the variation in the CVs profile of both supports, where the CV curves of TOMS support exhibited rectangular shapes with small reversible redox peaks at 0.65 $V_{RHE}$ typical for pseudo-capacitive materials. The TOMS support remained stable over the course of stability test, while showing slight surface modification in lower potential due to $H^+$ ad/desorption. The double layer region of TOMS was virtually unchanged, giving no indication of Ti, Mo, and Si oxidation/corrosion. The EIS respond of TOMS support represent as Nyquist and Capacitance plots over the course of the stability test (FIGS. 13B and 13C). The Nyquist plot exhibited short Warburg regions due to the high electronic conductivity of the TOMS support. The Warburg length remained unchanged over the course of the stability test, indicating no change in either the electronic or ionic conductivity during the AST. The limiting capacitance of TOMS showed negligible change over the course of 40000 cycles due to formation of $MoO_x(OH)_y$ on the surface, while the conductivity essentially remained unchanged. FIG. 13D shows the CVs profile of carbon Vulcan support over the course of the stability test. A strong oxidation current was observed for the carbon support, which, upon cycling the quinone/hydroquinone redox couple around 0.55-0.7 $V_{RHE}$, increased significantly after 500 cycles. Carbon support shows short Warburg regions, which remain stable over the course of stability testing, while its limiting capacitance exhibited about 35% decay over the 40000 cycles (see FIGS. 13E and 13F). The comparison of the stability test results between both supports indicates the TOMS as a more stable support than the carbon.

AST Protocol (II): Cycling Through Pt Oxide Growth/Removal at 25° C.

Figure 14:
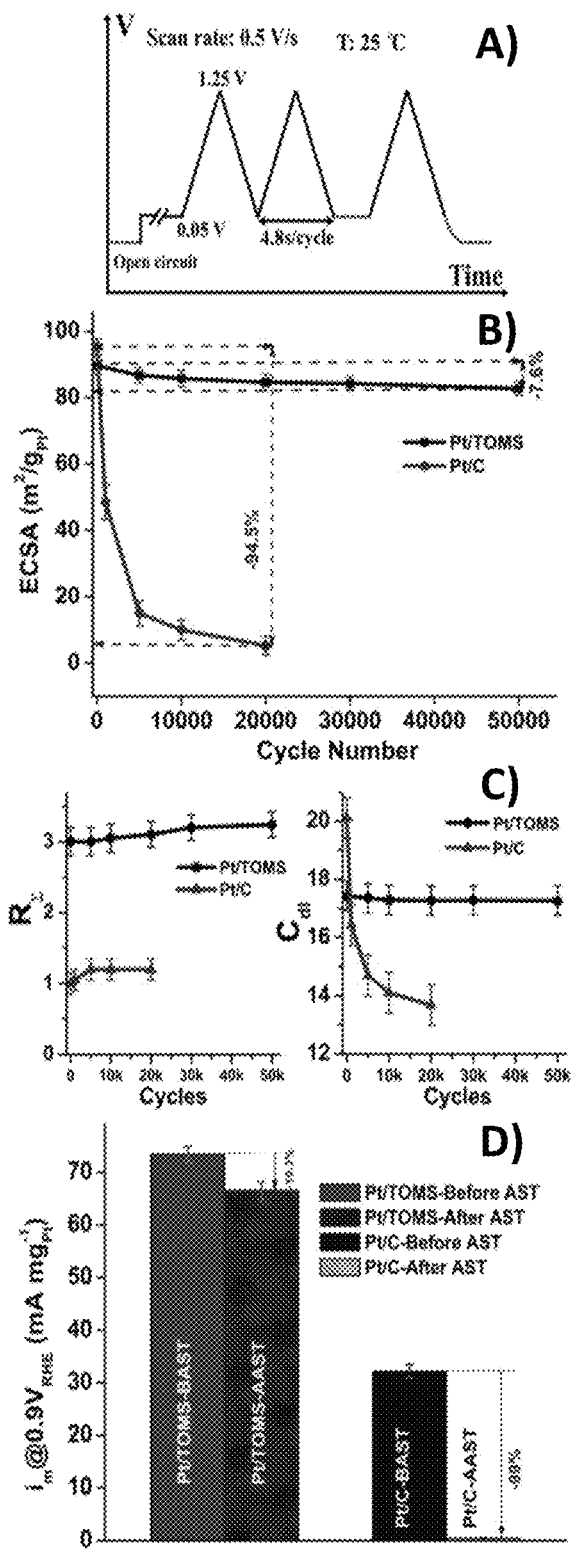
FIG. 14A shows a diagram of AST protocol II.
FIG. 14B shows ECSA variation of the Pt/TOMS and Pt/C catalysts over the course of AST protocol II.
FIG. 14C shows $R_\Sigma$ and $C_{dl}$ of Pt/TOMS and Pt/C obtained at DC bias potential of 0.425 $V_{RHE}$.
FIG. 14D shows ORR mass activity of Pt/TOMS and Pt/C before and after AST at 0.9 $V_{RHE}$.

The ex-situ stability test was performed on Pt/TOMS and Pt/C catalysts under the AST protocol (II), shown in FIG. 14A. The stability test was conducted by subjecting both catalysts to potential triangular-wave cycling in the range of 0.05-1.25 $V_{RHE}$ in 0.5 M $H_2SO_4$ at 25° C. Under this protocol, the stability of Pt NPs against agglomeration/dissolution over the TOMS and carbon support was evaluated. It was found that this protocol exacerbates Pt NPs size

TABLE 3

Summary of the key accelerated stress testing protocols employed

| Protocols No. | Wave form | LPL* $V_{RHE}$ | UPL** $V_{RHE}$ | Sweep rate/retention time | Total cycle | Electrolyte | Temp. |
|---|---|---|---|---|---|---|---|
| I | triangular | 0.05 | 1.25 | 500 mV/s | 40000 | 0.5M $H_2SO_4$ | 50° C. |
| II | triangular | 0.05 | 1.25 | 500 mV/s | 50000 | 0.5M $H_2SO_4$ | 25° C. |
| III | rectangular | 0.6 | 1 | 3 s | 10000 | 0.5M $H_2SO_4$ | 50° C. |
| IV | rectangular | 1 | 1.5 | 3 s | 10000 | 0.1M $H_2SO_4$ | 25° C. |
| V | triangular | 1 | 1.5 | 500 mV/s | 6000 | 0.1M $H_2SO_4$ | 50° C. |
| VI | triangular | 1 | 1.6 | 500 mV/s | 10000 | 0.1M $H_2SO_4$ | 25° C. |
| VII | triangular | 0.6 | 1 | 500 mV/s | 50000 | Nafion membrane | 50° C. |

*lower potential limit,
**upper potential limit growth since it cycles through Pt oxide growth/stripping without causing corrosion on most carbon supports.

Both catalysts exhibited the typical electrochemistry of polycrystalline Pt. The Pt/TOMS showed symmetrical potential for oxide formation over the surface of Pt at 0.78 $V_{RHE}$, while Pt/C cathodic scan for oxide removal exhibited at 0.69 $V_{RHE}$, which had a 90 mV delay compared to Pt/TOMS. A very small change in the CV profile was observed for Pt/TOMS over the course of the AST, while a significant change was observed for Pt/C.

FIGS. 14B to 14D compare the variation in the key electrochemical parameters over the course of the AST for each catalyst. Pt/TOMS displayed remarkable resilience to Pt surface area loss, showing only a 7.6±3% decline in its electrochemical active surface area (ECSA) after 50,000 cycles due to the SMSI between Pt NPs and TOMS support that mitigates segregation/agglomeration (see FIG. 14B). Likewise, the EIS response from Pt/TOMS was virtually unchanged. Minimal variation in $R_\Sigma$ and $C_{dl}$ (series capacitance at 0.1 Hz) with cycle number was observed. This indicates that there is no change in the electronic conductivity of Pt/TOMS over the course of the test and that support corrosion did not occur. On the other hand, Pt/C exhibited rapid decay in ECSA during the AST, losing 84% of its initial value after only 5000 cycles and overall losing 92% of its ECSA after 20000 cycles. The EIS response of the Pt/C showed minimal change in $R_\Sigma$ during the AST, indicating no change in electronic conductivity over the course of the test. A steady decline in $C_{dl}$ was also observed, which is due to the decrease in Pt surface area (FIG. 14C). This EIS decay profile is consistent with the expected profile for Pt particle size growth in the absence of support corrosion.

The ORR activity of both catalysts was assessed before and after the AST (FIG. 14D). The Pt/TOMS exhibited outstanding activity, with a high onset potential for O2 reduction followed by high half-wave potential of 0.9 $V_{RHE}$ compared to a half-wave potential of 0.86 $V_{RHE}$ for the commercial Pt/C. Moreover, Pt/TOMS shows excellent durability by only losing 10.3% of its initial mass activity at 0.9 $V_{RHE}$, while Pt/C exhibited massive degradation, showing no ORR activity at 0.9 $V_{RHE}$ after the stability test, which is according to ECSA loss of catalyst.

AST Protocol (III): Ex-Situ Load Cycling at 50° C.

Figure 15:
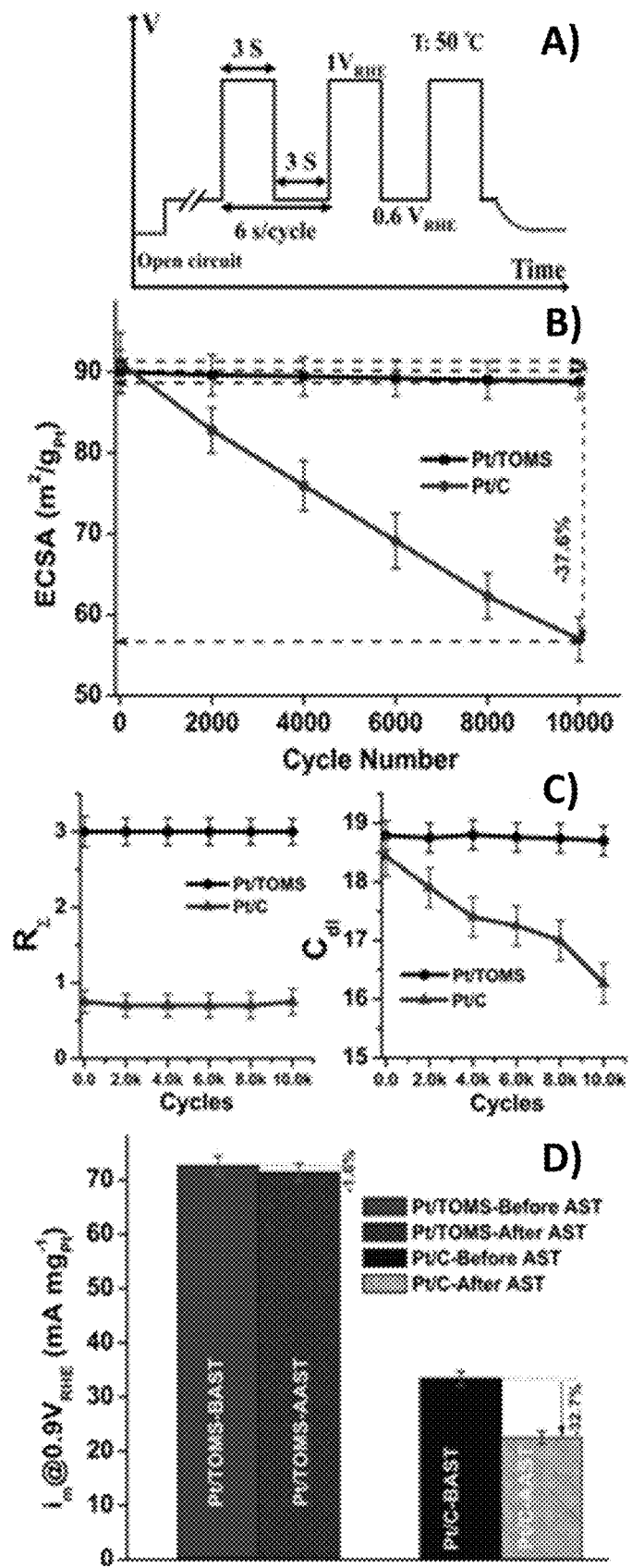
FIG. 15A shows a diagram of AST protocol III.
FIG. 15B shows ECSA variation of the Pt/TOMS and Pt/C catalysts over the course of AST protocol III.
FIG. 15C shows $R_\Sigma$ and $C_{dl}$ of Pt/TOMS and Pt/C obtained at DC bias potential of 0.425 $V_{RHE}$.
FIG. 15D shows ORR mass activity of Pt/TOMS and Pt/C before and after AST at 0.9 $V_{RHE}$.

The ex-situ stability of Pt/TOMS and Pt/C catalysts were evaluated according to fuel cell load cycling via potential rectangular-wave form. FIG. 15 shows a diagram of AST protocol (III) testing. This US Department of Energy (DoE) based protocol is commonly used to evaluate the stability of Pt NPs against dissolution/agglomeration. The stability test was conducted by subjecting the both catalysts to 10,000 cycles between 0.6 $V_{RHE}$ (close to the maximum power; approaching full load condition under fuel cell) and 1.0 $V_{RHE}$ (close to the open circuit voltage; approaching no-load condition under fuel cell) with retention time of 3 s in 0.5 M $H_2SO_4$ at 50° C. The impact of this stability protocol on catalysts, shows the significance of SMSI effect on stabilization of Pt NPs over the supporting materials by avoiding involvement of support corrosion in catalyst deactivation mechanism.

Over the course of the stability test the Pt/TOMS retained its excellent activity by showing only a miniscule decay in ECSA (less than 2%), with no change in CV shape. This indicates a very strong interaction between Pt NPs and TOMS support (FIG. 15B). EIS measurements showed that both the $R_\Sigma$ and $C_{dl}$ were virtually unchanged for Pt/TOMS over the course of AST (FIG. 15C). Contrarily, the Pt/C catalyst shows 37.6% decay in ECSA. EIS studies revealed that $R_\Sigma$ did not vary over the course of the measurement, but $C_{dl}$ did decrease by ca. 12% during the AST, which is characteristic of Pt NPs dissolution/agglomeration being the dominant degradation mechanism (FIG. 15C). The ORR activity of both catalysts was assessed before and after the AST. The Pt/TOMS showed only slightly decay in activity, whereas the Pt/C catalyst showed a 32.7% decline in ORR activity (FIG. 15D).

AST Protocol (IV): Ex-Situ Start Up/Shutdown at 25° C.

The ex-situ stability of Pt/TOMS and Pt/C catalysts was evaluated according to fuel cell vehicle startup-shutdown condition, using a rectangular potential waveform that cycles between 1.0 $V_{RHE}$ and 1.5 $V_{RHE}$ using a retention time of 3 s in 0.1 M $H_2SO_4$ at 25° C. for 10,000 cycles. Using this protocol, the stability of TOMS and carbon supports against corrosion and stability of Pt NPs over the supports against dissolution/agglomeration were assessed.

Figure 16:
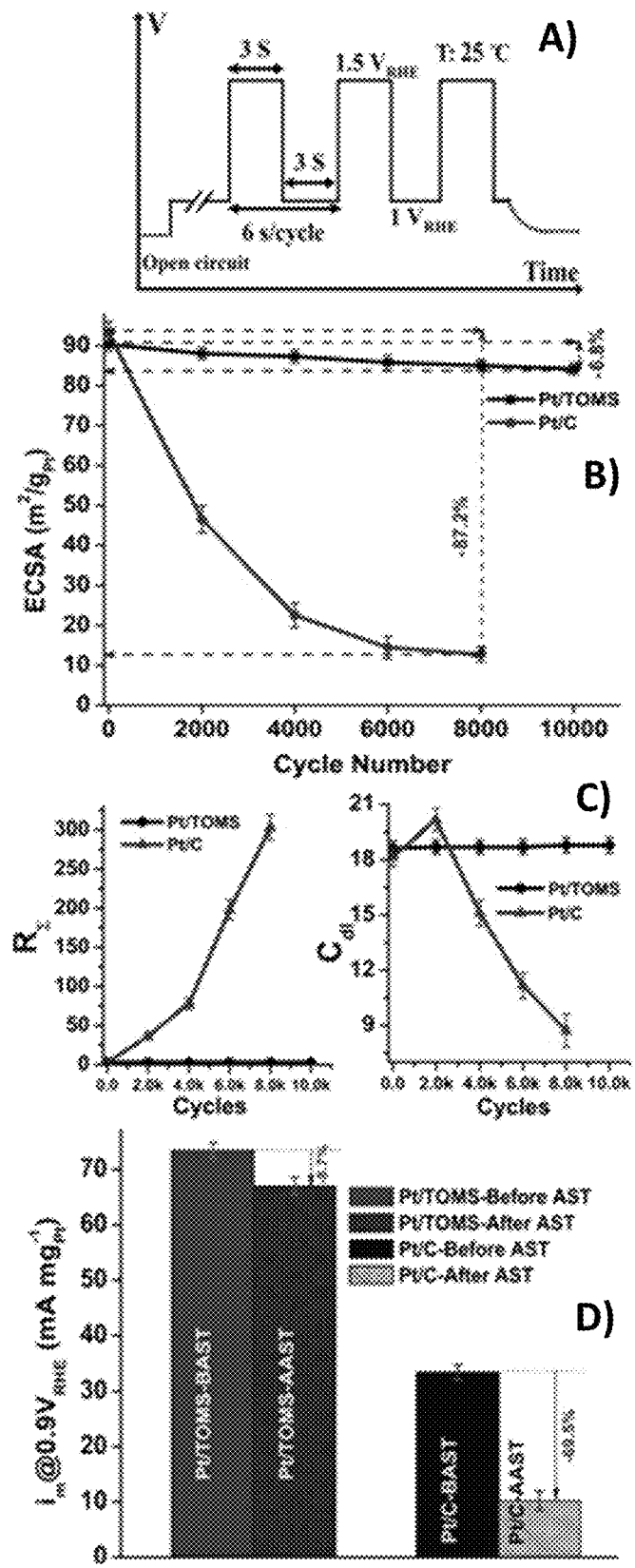
FIG. 16A shows a diagram of AST protocol IV.
FIG. 16B shows ECSA variation of the Pt/TOMS and Pt/C catalysts over the course of AST protocol IV.
FIG. 16C shows $R_\Sigma$ and $C_{dl}$ of Pt/TOMS and Pt/C obtained at DC bias potential of 0.425 $V_{RHE}$.
FIG. 16D shows ORR mass activity of Pt/TOMS and Pt/C before and after AST at 0.9 $V_{RHE}$.

Over the course of stability testing, no sign of surface modification/degradation was observed on the double layer region of the Pt/TOMS catalyst. The ECSA remained quite stable, showing only 6.8±2% decay (FIG. 16A). The EIS response of Pt/TOMS was virtually unchanged, with near constant values of $R_\Sigma$ and $C_{dl}$ throughout the AST. However, an extremely rapid decay in ECSA was observed for Pt/C, losing 87% of its initial ECSA after 8000 cycles (FIG. 16B). ECSA could not be accurately measured after 10,000 cycles. Over the course of stability, the Pt/C catalyst showed different trend on double layer region. Impedance measurements revealed that $R_\Sigma$ increased steadily throughout the AST for Pt/C (FIG. 16C). Furthermore, $C_{dl}$ initially increased after 2000 cycles, which was attributed to the oxidative formation of pseudo-capacitive groups on the carbon surface. $C_{dl}$ declined upon continued cycling of Pt/C. This EIS response is characteristic of carbon support corrosion.

FIG. 16D compares the ORR activity of both catalysts before and after the AST. Pt/TOMS showed high retention of activity, showing only a 8.7% decay in ORR mass activity at 0.9 $V_{RHE}$ after 10,000 cycles. On the other hand, Pt/C lost ca. 70% of its initial activity at 0.9 $V_{RHE}$ due to Pt NPs sintering and carbon corrosion.

AST Protocol (V): Ex-Situ Start Up/Shutdown at 50° C.

Figure 17:
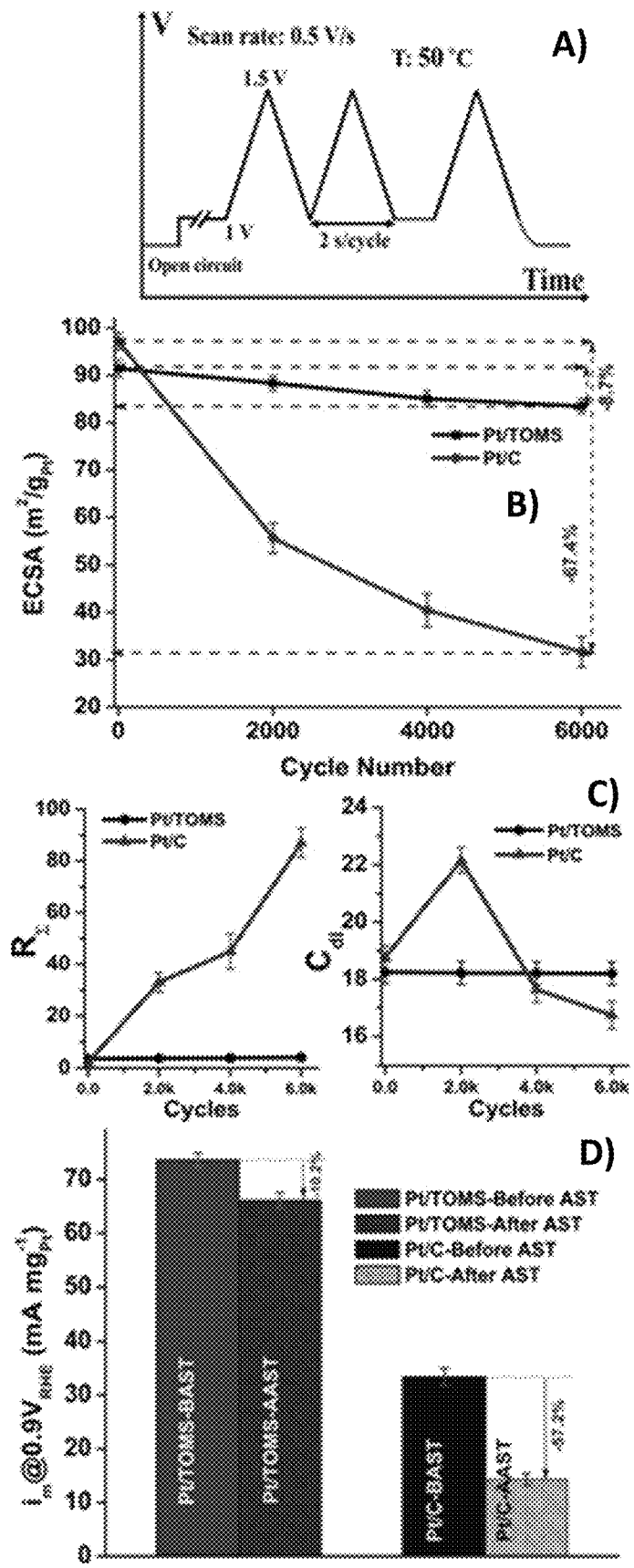
FIG. 17A shows a diagram of AST protocol V.
FIG. 17B shows ECSA variation of the Pt/TOMS and Pt/C catalysts over the course of AST protocol V.
FIG. 17C shows $R_\Sigma$ and $C_{dl}$ of Pt/TOMS and Pt/C obtained at DC bias potential of 0.425 $V_{RHE}$.
FIG. 17D shows ORR mass activity of Pt/TOMS and Pt/C before and after AST at 0.9 $V_{RHE}$.

To further probe stability under startup-shutdown conditions, a more aggressive ex-situ AST at increased temperature was conducted. FIG. 17A shows a diagram of AST Protocol (V). This involved exposing each catalyst to an ex-situ AST using a potential triangular-wave form between 1-1.5 $V_{RHE}$ at a scan rate of 500 mV/s in 0.1 M $H_2SO_4$ at 50° C. for 6,000 cycles. Even at elevated temperatures, the ECSA of Pt/TOMS showed only a small decay (ca. 8.7%) (FIG. 17B). EIS results showed that $R_\Sigma$ and $C_{dl}$ also didn't vary during the AST, indicating the support did not corrode during the AST (FIG. 17C). Much like the room temperature AST, the Pt/C catalyst showed a significant decline in ECSA (ca. 67%) and changes in EIS that confirm carbon support corrosion is prevalent. Consequently, the ORR activity of Pt/TOMS catalyst decayed by only 10.2%, whereas the ORR activity of the Pt/C catalyst decayed drastically (ca. 67%) (FIG. 17D).

Moreover, the durability trend of Pt/TOMS was quite similar in both protocols IV and V, indicating that the test temperature did not have a large effect on support stability. Furthermore, while the different wave forms used the same potential ranges, protocol IV did employ a longer retention time at the upper potential limit (UPL), but that did not seem to greatly alter stability.

AST Protocol (VI): Ex-Situ Start Up/Shutdown at 25° C. with Higher UPL

Figure 18:
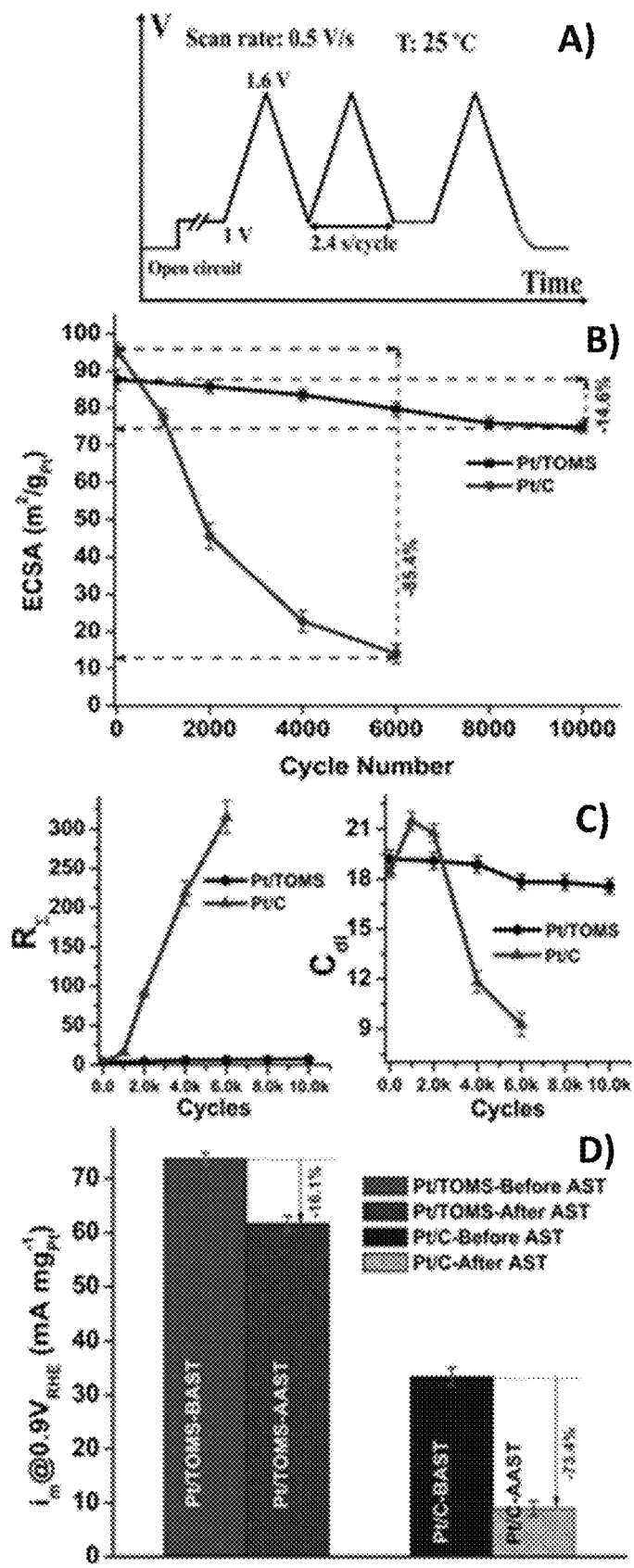
FIG. 18A shows a diagram of AST protocol V.
FIG. 18B shows ECSA variation of the Pt/TOMS and Pt/C catalysts over the course of AST protocol VI.
FIG. 18C shows $R_\Sigma$ and $C_{dl}$ of Pt/TOMS and Pt/C obtained at DC bias potential of 0.425 $V_{RHE}$.
FIG. 18D shows ORR mass activity of Pt/TOMS and Pt/C before and after AST at 0.9 $V_{RHE}$.

To further stress the Pt/TOMS catalyst, a modified the startup-shutdown AST was employed to have a higher UPL of 1.6 $V_{RHE}$ in order to probe its influence on durability. This ex-situ AST protocol employed a potential triangular-wave form between 1-1.6 $V_{RHE}$ at a scan rate of 500 mV/s in 0.1 M $H_2SO_4$ at 25° C. for 10,000 cycles (FIG. 18A). Increasing the UPL to 1.6V caused a 14.5% decay in ECSA for the Pt/TOMS catalyst (FIG. 18B). While this was slightly higher than in any other test, it is still remarkably low. Furthermore, the EIS results indicate minimal fluctuation in both $R_\Sigma$ and $C_{dl}$ over the 10,000 cycles, indicating that the high corrosion-resistance of this support is maintained at the higher UPL (FIG. 18C). As expected, the Pt/C exhibited massive decay (85.4%) in ECSA after only 6000 cycles, attributed to both carbon corrosion (confirmed by EIS) and Pt NPs sintering/agglomeration (FIG. 18C). The ORR activity was reassessed for both catalysts after the AST. Pt/TOMS displayed a 16% decrease in ORR activity after 10,000 cycles, whereas Pt/C showed a 73% decline after only 6000 cycles (FIG. 18D).

AST Protocol (VII): In-Situ Load Cycling

In order to confirm the Pt/TOMS ex situ durability translate to a fuel cell environment, membrane electrode assemblies were prepared and tested in a fuel cell. An in-situ stability test was performed on Pt/TOMS and Pt/C-based electrodes. The AST protocol employed a potential triangular-wave form between 0.6-1.0 $V_{RHE}$ at a scan rate of 500 mV/s at 50° C. for 50,000 cycles with feeding gases of $H_2$ and $N_2$ (100/200 ml $min^{-1}$) to anode and cathode respectively.

Figure 19:
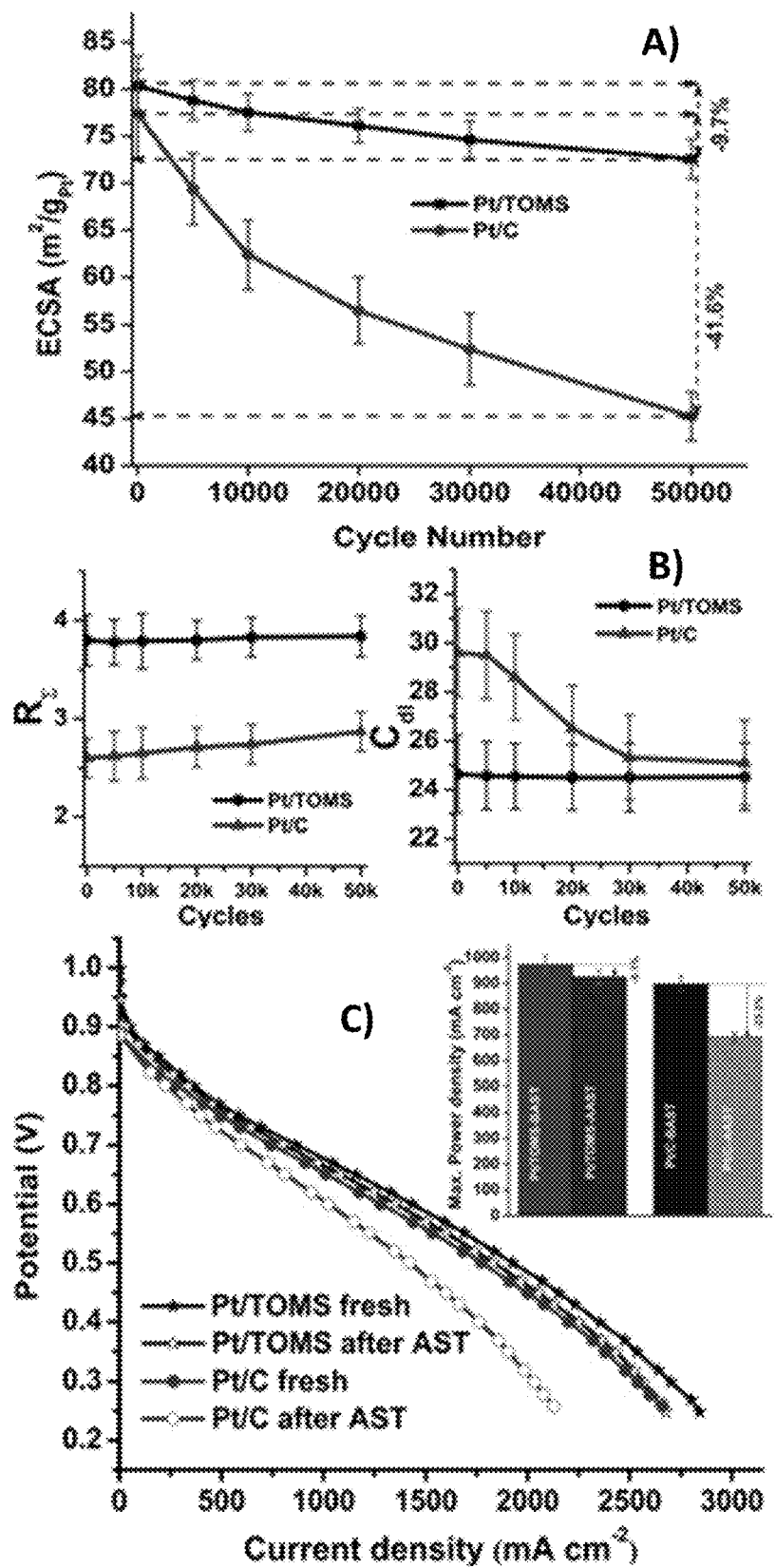
FIG. 19A shows ECSA variation of the Pt/TOMS and Pt/C MEA over the course of AST protocol IIV
FIG. 19B shows $R_\Sigma$ and $C_{dl}$ of Pt/TOMS and Pt/C obtained at DC bias potential of 0.425 $V_{RHE}$.
FIG. 19C shows fuel cell performance of Pt/TOMS and Pt/C before and after fuel cell measurements were made at 80° C., using a Pt loading of 0.2 mg cm-2, a $H_2$ flow rate of 100 ml min-1, 100% RH, 1 bar back pressure and an $O_2$ flow rate of 200 ml min-1, 100% RH, 1 bar back pressure.

The Pt/TOMS catalyst remained stable, losing only 9.7% of its ECSA over 50,000 cycles, with virtually no change in its key EIS parameters. Conversely, Pt/C catalyst exhibited 41.6% decay in ECSA (FIG. 19A), while $R_\Sigma$ remained stable and $C_{dl}$ declined by 15.2% over the course of the AST (FIG. 19B). These decay profiles are consistent with the ex situ tests, indicating a faster rate of Pt particle size growth for Pt/C but no signs of support corrosion.

The fuel cell performance of each catalyst was measured before and after stability test, which is shown in FIG. 19C. The Pt/TOMS-based MEA produced a maximum power density of 970 mW $cm^{-2}$ at the start if the AST and decayed by only 4.7% (to 925 mW $cm^{-2}$) after the AST. The Pt/C-based MEA exhibited maximum power density of 900 mW $cm^{-2}$ at the start of the AST and decayed by 23.2% (to 692 mW $cm^{-2}$) after the AST. This test clearly shows that the enhanced activity and durability of Pt/TOMS can be harness in practical fuel cell devices.

In some embodiments, the TOMS material may be suitable for use in electrochemical devices, both for electrochemical energy conversion/storage and electrochemical analysis. For instance, as noted herein, the TOMS may be used as a catalyst support material for fuel cell electrodes and that the Pt/TOMS catalyst demonstrates improved electrocatalytic activity and stability of the oxygen reduction reaction, which is a key reaction in polymer electrolyte membrane fuel cells (PEMFC).

In some embodiments, the TOMS material and/or the Pt/TOMS catalyst may be suitable for use as PEMFC electrocatalysts, both in acidic media and alkaline media (alkaline fuel cells) that employ hydrogen as a fuel. In these embodiments, alloy catalysts may be deposited on the TOMS material. For instance, alloy catalysts deposited on TOMS that are suitable for use as PEMFC electrocatalysts may include, but are not limited to, Pt—Ni/TOMS and/or Pt—Co/TOMS.

In some embodiments, the TOMS material and/or the Pt/TOMS catalyst may also be suitable for use in direct alcohol fuel cells, including direct methanol and direct ethanol fuel cells. In these embodiments, metal catalysts may be deposited on the TOMS materials. Metal catalysts deposited on TOMS suitable for use in direct alcohol fuel cells, including direct methanol and direct ethanol fuel cells, may include but are not limited to, Pt—Ru/TOMS and Pt—Sn/TOMS (see Examples, below).

In some embodiments, the TOMS material and/or the Pt/TOMS catalyst may be suitable for use in formic acid fuel cells. In these embodiments, the metal catalysts may be deposited on the TOMS materials. Metal catalysts deposited on TOMS suitable for use in formic acid fuel cells may include but are not limited to Pd/TOMS.

In some embodiments, the TOMS material and/or the Pt/TOMS catalyst may be suitable for use in water electrolyzers.

In some embodiments, the TOMS material and/or the Pt/TOMS catalyst may be suitable for use as supercapacitors/electrochemical capacitors.

In some embodiments, the TOMS material and/or the Pt/TOMS catalyst may be suitable for use as electrochemical sensors. For example, the TOMS material and/or the Pt/TOMS catalyst may be suitable for use as breath alcohol sensors (i.e. breathalyzers) and glucose sensors.

EXAMPLES

Titanium(IV) oxide, anatase ($TiO_2$) 99.8 wt %, chloroplatinic acid hexahydrate ($H_2PtCl_6.6H_2O$)≥37.50% Pt basis, sodium borohydride ($NaBH_4$) 98 wt %, ethylene glycol 98 wt % (EG), potassium hydroxide (KOH) 85 wt %, ammonium hydroxide ($NH_4OH$) 28.0% $NH_3$ basis, polyvinylpyrrolidone (PVP40: $(C_6H_9NO)_n$ average molar weight 40 000), poly(ethylene glycol)-block-poly(propylene glycol)-block-poly(ethylene glycol) (Pluronic® 123, average molar weight 5800), sulfuric acid ($H_2SO_4$) 95-98 wt %, Nafion® perfluorinated resin solution 5 wt %, acetone ($CH_3$—$COCH_3$) 99.5 wt %, 2-propanol ($C_3H_8O$) 99.5 wt %, ammonium molybdate ($H_{24}MO_7N_6O_{24}.4H_2O$), Silicon nano-powder (Si)>98%, were purchased from Sigma-Aldrich. A commercial platinum catalyst 20 wt % on carbon black Johnson Matthey, HiSPEC 3000 was purchased from Alfa Aesar. A gas diffusion layer (GDL) Elat LT1400W single sided was purchased from NuVant Systems Inc. A Nafion® membrane NRE212 was purchased from Ion Power and nitrogen and oxygen gases were supplied in cylinders by PRAXAIR with 99.999% purity. All aqueous solutions were prepared using ultrapure water obtained from a Millipore Milli-Q system with resistivity >18 mΩ $cm^{-1}$.

Synthesis of the $Ti_3O_5MO_{0.2}Si_{0.4}$ (TOMS) Support Structure

The TOMS support structure was prepared by doping commercial $TiO_2$ anatase with Mo and Si. $TiO_2$ was dispersed in a solution of (70:30 vol %) ultrapure water and ethanol, followed by the addition of 2 wt % Pluronic P123 surfactant. The obtained solution was stirred for 5 hours at ambient temperature. Then 20 wt % of MO ($H_{24}Mo_7N_6O_{24}.4H_2O$) was added to the solution. The pH of the solution was held constant at pH=9 by adding $NH_4OH$. The solution was continuously stirred at room temperature for another 5 h under $N_2$ purging, and dried at 80° C. The obtained powder was annealed at 850° C. (heating rate of 10° C. min$^{-1}$) for 8 h under a reducing atmosphere (H$_2$:N$_2$ 10:90 vol %). The obtained Ti$_3$O$_5$Mo$_{0.2}$ powder dispersed in a solution of (50:50 vol %) ultrapure water and ethanol followed by the addition of 2 wt % Pluronic P123 surfactant and 10 wt % Si NPs. The solution was stirred at room temperature for another 3 h under N$_2$ purging, and dried at 80° C. The obtained powder was annealed at 550° C. (heating rate of 10° C. min$^{-1}$) for 5 h under a reducing atmosphere (H$_2$:N$_2$ 10:90 vol %).

Synthesis of a Pt/Ti$_3$O$_5$Mo$_{0.2}$Si$_{0.4}$ (Pt/TOMS) Support

The synthesis of a Pt/TOMS electrocatalyst was performed through a modified polyol method. 200 mg of the TOMS support structure was added to a solution of EG and ethanol (80:20 ml). The mixture was left stirring for 1 h. Then 5 wt % PVP was added to the solution and left stirring for 3 h. A solution of H$_2$PtCl$_6$·6H$_2$O (80 mg) was dissolved in EG (5 ml), added to the solution containing TOMS and left stirring for 3 h at pH 11 by adding 1 M KOH. The solution was heated at 90° C. under a water-cooled reflux condenser for 5 h, and after that the solution was cooled to room temperature and then stirred for 6 h. The pH of the solution was brought to 4 by adding 1 M HNO$_3$, and left stirring for 12 h. The obtained solution was filtered, washed with ultrapure water, and subsequently dried at 80 C under N$_2$ purging. The obtained sample of Pt/TOMS was annealed at 450° C. (heating rate of 5° C. min$^{-1}$) for 4 h under a reducing atmosphere (H$_2$:N$_2$ 10:90 vol %).

Physical Characterization of the Electrocatalysts

The phases and lattice parameters of the TOMS and Pt/TOMS were characterized by using X-ray diffraction (XRD) employing a Rigaku Ultima IV X-ray diffractometer system detector. This instrument employed Cu K$_\alpha$ radiation, ($\lambda$=0.15418 nm) operating at 40 kV and 44 mA. Diffuse reflectance UV-vis spectra of TiO$_2$(IV) oxide, anatase and synthesized TOMS were recorded using a Perkin Elmer Lambda-750S UV/VIS spectrometer. The optical absorption spectra were used to determine the band gap of each sample by applying the Tauc equation. The surface composition of the Pt/TOMS catalyst was studied by XPS, employing the Thermo Scientific K-Alpha Angle-Resolved system equipped with a monochromatic Al K$_\alpha$ (1486.7 eV) X-ray source and a 180 double focusing hemispherical analyzer with a 128 channel detector with effective charge compensation. Transmission electron microscopy (TEM) images of the TOMS support structure and the Pt/TOMS electrocatalyst were acquired using a Zeiss Libra 200MC Transmission Electron Microscopy (TEM) system operating at 200 kV. Scanning Electron Microscopy (SEM) images were obtained using a Hitachi FlexSEM 1000 system equipped with an energy dispersive X-ray analyzer. The electrical conductivity of the TOMS support structure was measured in the solid state phase via two-point probe measurements. The TOMS powder was pelletized under a manual press (15000 pounds), resulting in the TOMS pellet with a diameter of 10 mm and a thickness of 1 mm. The TOMS pellet was placed between two copper probes with 9.3 mm cross section, and then the potential in the range of 0.1-1.2 V vs. RHE was applied in order to measure the produced current.

Electrochemical Characterization of the Electrocatalysts

The electrochemical evaluation of catalysts and catalyst supports was performed by immobilizing the sample onto the surface of a glass carbon rotating disk electrode (Pine Instruments). Inks were prepared by dispersing each catalyst in a solution containing ultrapure water and isopropanol alcohol (50-50 vol %), followed by adding Nafion® at an ionomer-to catalyst ratio of 0.15. After mixing, 4 mL of ink was deposited onto the surface of the glassy carbon electrode (0.19625 cm$^2$), and allowed to dry for 20 minutes. This ink-coated electrode served as the working electrode and was placed in a solution of 0.5 M H$_2$SO$_4$ along with a Hg/HgSO$_4$ reference electrode and either a graphite rod or a Pt wire counter electrode.

Electrochemical experiments were performed using either a Pine WaveDriver 20 potentiostat or a Solartron 1470 multichannel potentiostat coupled to a Solartron 1260 Frequency response analyzer. Cyclic voltammetry (CV) and electrochemical impedance spectroscopy (EIS) experiments were performed in N$_2$-saturated solution. Impedance spectra were collected over a frequency range of 100 kHz to 0.1 Hz at a DC bias potential of 0.425 V vs. RHE. The ORR activity was assessed using linear sweep voltammetry using a rotating disk electrode in O$_2$-saturated solution. Catalyst durability was assessed using an accelerated stress test (AST) that involved repeated cycling of the working electrode potential between 0.05 and 1.25 V vs. RHE at a scan rate of 50 mV s$^{-1}$, in an N$_2$-saturated 0.5 M H$_2$SO$_4$ solution. According to the United States Department of Energy testing protocols, this potential range assures the accelerated corrosion of the support as well as the sintering of Pt NPs. The electrode condition was monitored by periodic CV and EIS assessments throughout the AST. In addition, the ORR activity of each electrocatalyst was assessed before and after the AST.

Membrane Electrode Assembly (MEA) Preparation and Testing

Both Pt/TOMS and Pt/C MEA were prepared through ink spray deposition onto the gas diffusion layer (GDL). The obtained electrodes were dried over a vacuum plate at 50° C. for 2 hours, and then transferred to an oven at 80° C. for 6 h. Both electrodes had Pt loadings of 0.20 mg cm$^2$ and contained 30 wt % Nafion. MEAs were fabricated by hot-pressing (150 kg cm$^2$ for 90 s at 110° C.) the two identical electrodes across a Naflon® NRE212 membrane. MEAs were tested in a 5 cm$^2$ test fuel cell (Fuel Cell Technologies) on a commercial fuel cell test station (Fuel Cell Technologies) controlled using Labview software.

Methanol Oxidation Activity

The electrocatalytic activity of Pt/TOMS towards methanol oxidation was primarily assessed in 0.5 M H$_2$SO$_4$+0.5 M MeOH by both CV and chronoamperometry (CA). CV was performed between 0.05 and 1.25 V$_{RHE}$ at a sweep rate of 20 mV s$^{-1}$. CA was performed at a fixed potential of 0.7 V$_{RHE}$ for 6 hours. The influence of methanol concentration was also examined using concentrations between 0.1 M and 1.0 M.

Figure 20:
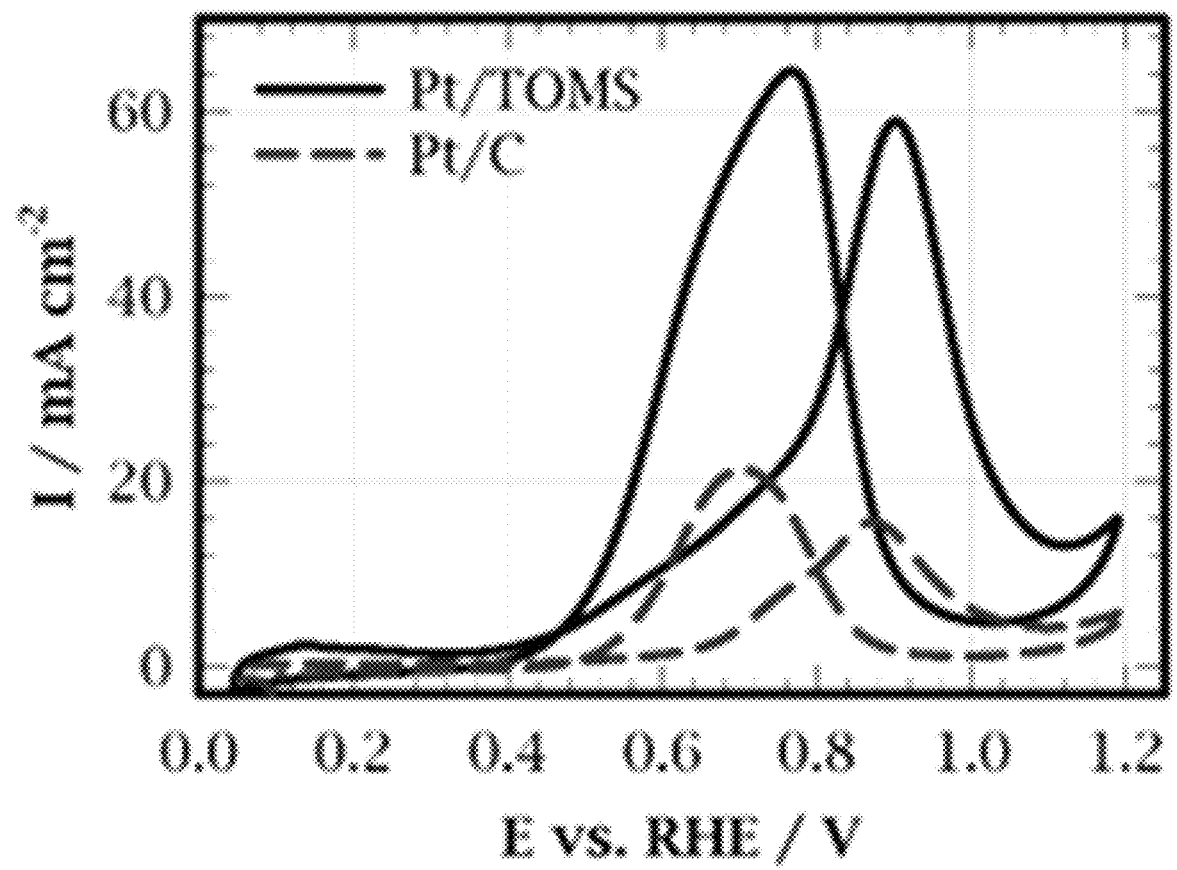
FIG. 20 shows a graph showing potentiodynamic (20 mV s-1) methanol oxidation over Pt/TOMS compared with conventional Pt/C in 0.5 M $H_2SO_4$ containing 0.5 M methanol at 20° C.

FIG. 20 compares MOR activity of Pt/TOMS to that of Pt/C as assessed by CV. Methanol oxidation at Pt/TOMS commenced at Σ 0.4 V$_{RHE}$, compared with that of Pt/C at Σ 0.65 V$_{RHE}$. The dominant feature of the forward scan is a strong peak at 0.9 V$_{RHE}$ for Pt/TOMS and at 0.88 V$_{RHE}$ for Pt/C. This peak is known to represent methanol oxidation, which often follows a poorly defined small shoulder. It has been documented that dehydrogenation of methanol following adsorption on Pt sites leaves CO adsorbates, which require oxygen containing groups (e.g. —OH) in proximity to the CO adsorbates to produce CO$_2$ and complete the MOR process. The main peak gave a maximum current density of 58.92 mA cm$^{-2}$ (corresponding to 2.94 Å mg$_{Pt}^{-1}$) over the Pt/TOMS catalyst, while that at Pt/C was nearly 4 times smaller (i.e. 15.6 mA cm$^{-2}$). As such, the MOR at Pt/TOMS initiated at 0.4 V$_{RHE}$, which is over 0.25 V earlier than that of Pt/C (0.65 V$_{RHE}$).

To assess this further, electrochemical impedance spectroscopy (EIS) experiments were performed at 0.6 V$_{RHE}$.

Figure 21:
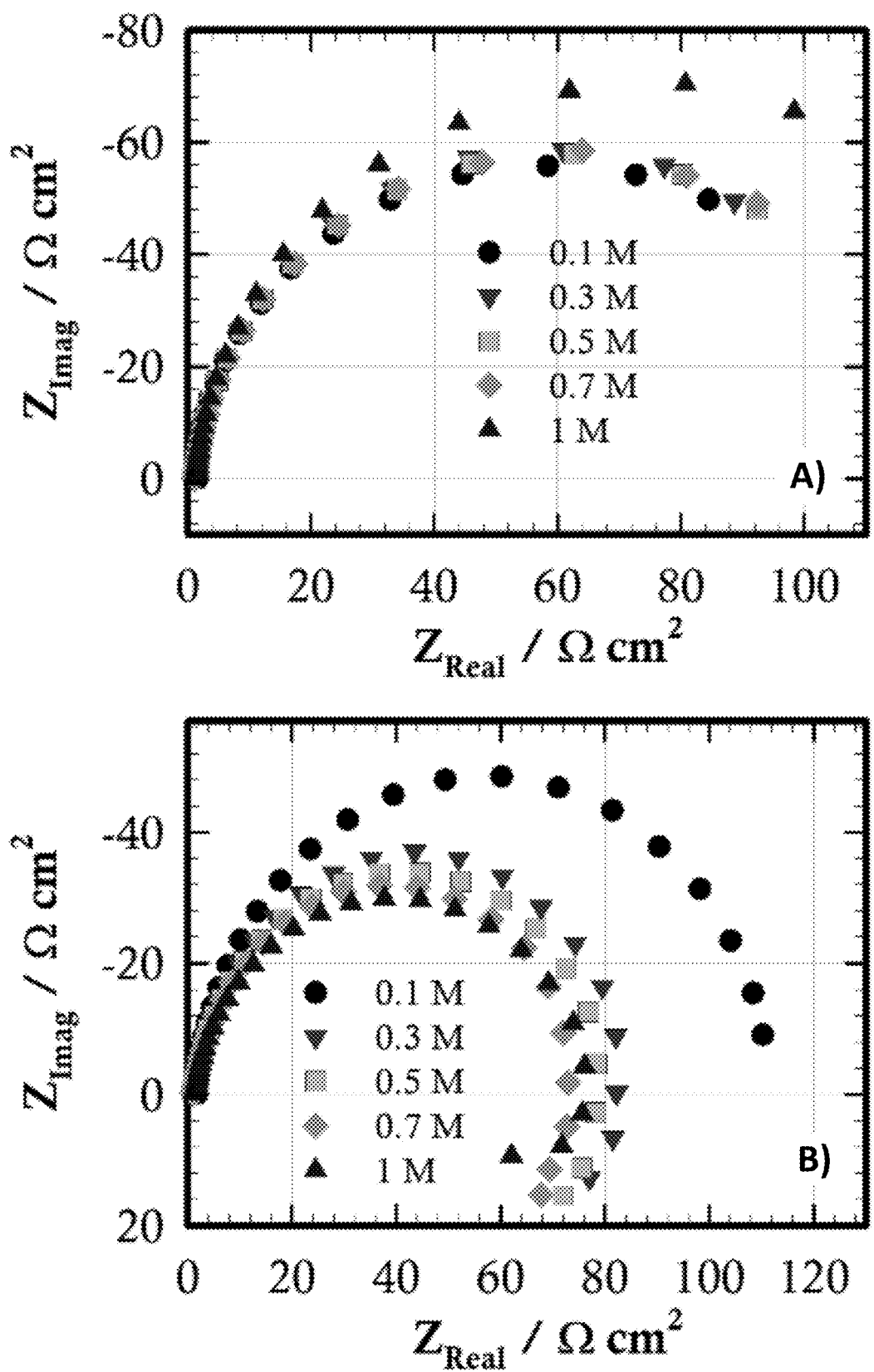
FIG. 21A shows impedance spectroscopy over Pt/C at 0.4 $V_{RHE}$ as a function of methanol concentration at 22° C.
FIG. 21B shows impedance spectroscopy over Pt/TOMS at 0.4 $V_{RHE}$ as a function of methanol concentration at 22° C.

FIGS. 21A and 21B display the Nyquist plots for Pt/C and Pt/TOMS, respectively, obtained using different methanol concentrations. Both catalysts generated EIS profiles consisting mainly of a semicircle, which should represent a charge transfer resistance associated with the MOR (rate-deterministic step). The Nyquist plots show that the size of the semicircle over Pt/C remained nearly unchanged within the range of concentration (with a slight increase from 0.7 to 1 M), while it noticeably decreased at the Pt/TOMS catalyst as the methanol concentration was increased. As a control experiment, MOR CVs were also performed as a function of methanol concentration, which showed both catalysts were nearly linearly responsive (peak current as probe) to the increase in concentration. Thus, the unchanged MOR activity at Pt/C suggests that 0.6 $V_{RHE}$ is insufficient to free reaction sites via removal of the adsorbed reaction intermediates; therefore, increasing the methanol concentration would have no or minor effects. However, the enhanced MOR activity of Pt/TOMS at 0.6 $V_{RHE}$ with methanol concentration suggests that the catalyst actively removes the absorbed intermediates to provide fresh reaction sites, which makes the EIS response concentration dependent.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A fuel cell electrocatalyst comprising:
    a support structure including:
        at least one titanium suboxide;
        a first dopant; and
        a second dopant; and
    a metal catalyst deposited on the support structure;
    wherein the first dopant is molybdenum and the second dopant is silicon; and wherein the support structure has the formula $Ti_3O_5$—$Mo_xSi_y$, and x is 0.2 and y is 0.4.

2. The fuel cell electrocatalyst of claim 1, wherein the support structure has a band gap that is less than 1 eV.

3. The fuel cell electrocatalyst of claim 1, wherein the support structure has a band gap that is about 0.31 eV.

4. The fuel cell electrocatalyst of claim 1, wherein the metal catalyst is platinum or a platinum alloy.

5. The fuel cell electrocatalyst of claim 4, wherein the platinum or platinum alloy is platinum or platinum alloy nanoparticles.

6. A fuel cell catalyst support structure comprising:
    at least one titanium suboxide;
    a first dopant; and
    a second dopant;
    wherein the first dopant is a molybdenum and the second dopant is silicon; and
    wherein the support structure has the formula $Ti_3O_5$—$Mo_xSi_y$, and x is 0.2 and y is 0.4.

7. The fuel cell catalyst support structure of claim 6, wherein the support structure has a band gap that is less than 1 eV.

8. The fuel cell catalyst support structure of claim 6, wherein the support structure has a band gap that is about 0.31 eV.

* * * * *